(12) United States Patent
Higashiyama et al.

(10) Patent No.: US 8,488,203 B2
(45) Date of Patent: Jul. 16, 2013

(54) IMAGE FORMING APPARATUS, IMAGE FORMING METHOD, AND COMPUTER PROGRAM PRODUCT THAT PERFORMS SKEW CORRECTION

(75) Inventors: Makoto Higashiyama, Kanagawa (JP); Yoshiaki Kawai, Kanagawa (JP); Shingo Nishizaki, Kanagawa (JP); Tomohide Kondoh, Kanagawa (JP); Masashi Suzuki, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 670 days.

(21) Appl. No.: 12/725,760

(22) Filed: Mar. 17, 2010

(65) Prior Publication Data

US 2010/0253981 A1 Oct. 7, 2010

(30) Foreign Application Priority Data

Mar. 18, 2009 (JP) ................................ 2009-067127
Mar. 15, 2010 (JP) ................................ 2010-058485

(51) Int. Cl.
*H04N 1/00* (2006.01)
*H04N 1/40* (2006.01)
*G06K 9/32* (2006.01)

(52) U.S. Cl.
USPC .......... 358/3.26; 358/3.24; 358/3.15; 382/289

(58) Field of Classification Search
None
See application file for complete search history.

(56) References Cited

U.S. PATENT DOCUMENTS

| 7,133,627 | B2 | 11/2006 | Nishizaki |
| 7,365,880 | B2 * | 4/2008 | Yamamoto et al. ............ 358/2.1 |
| 7,466,472 | B2 | 12/2008 | Kawai |
| 7,493,072 | B2 | 2/2009 | Sato et al. |
| 7,528,995 | B2 | 5/2009 | Kawai |
| 7,843,604 | B2 * | 11/2010 | Higashiyama et al. ........ 358/1.9 |
| 8,154,767 | B2 * | 4/2012 | Muramatsu .................. 358/3.06 |
| 2007/0140721 | A1 | 6/2007 | Shinohara et al. |
| 2008/0044195 | A1 | 2/2008 | Higashiyama et al. |
| 2009/0213401 | A1 | 8/2009 | Higashiyama et al. |
| 2009/0231606 | A1 * | 9/2009 | Kawai et al. ................... 358/1.9 |

FOREIGN PATENT DOCUMENTS

| JP | 2000-253231 | 9/2000 |
| JP | 2001-245156 | 9/2001 |
| JP | 2001-260422 | 9/2001 |
| JP | 3556349 | 5/2004 |
| JP | 3715349 | 9/2005 |

* cited by examiner

*Primary Examiner* — Barbara Reinier
(74) *Attorney, Agent, or Firm* — Oblon, Spivak, McClelland, Maier & Neustadt, L.L.P.

(57) ABSTRACT

An image forming apparatus includes a skew correcting unit that performs skew correction by dividing an input image that has undergone a halftone process into image data in a predetermined skew correction area in a main scanning direction and by shifting the image data in the skew correction area in a sub-scanning direction; an edge detecting unit that detects whether a pixel at a division position is an edge pixel based on concentrations of a set of pixels including the pixel at the division position; a correction area determining unit that, if detected that the pixel at the division position is the edge pixel, determines a correction area that is an area of pixels including the edge pixel to be subjected to concentration correction within the skew correction area; and an edge correcting unit that corrects concentrations of the pixels within the correction area.

18 Claims, 23 Drawing Sheets

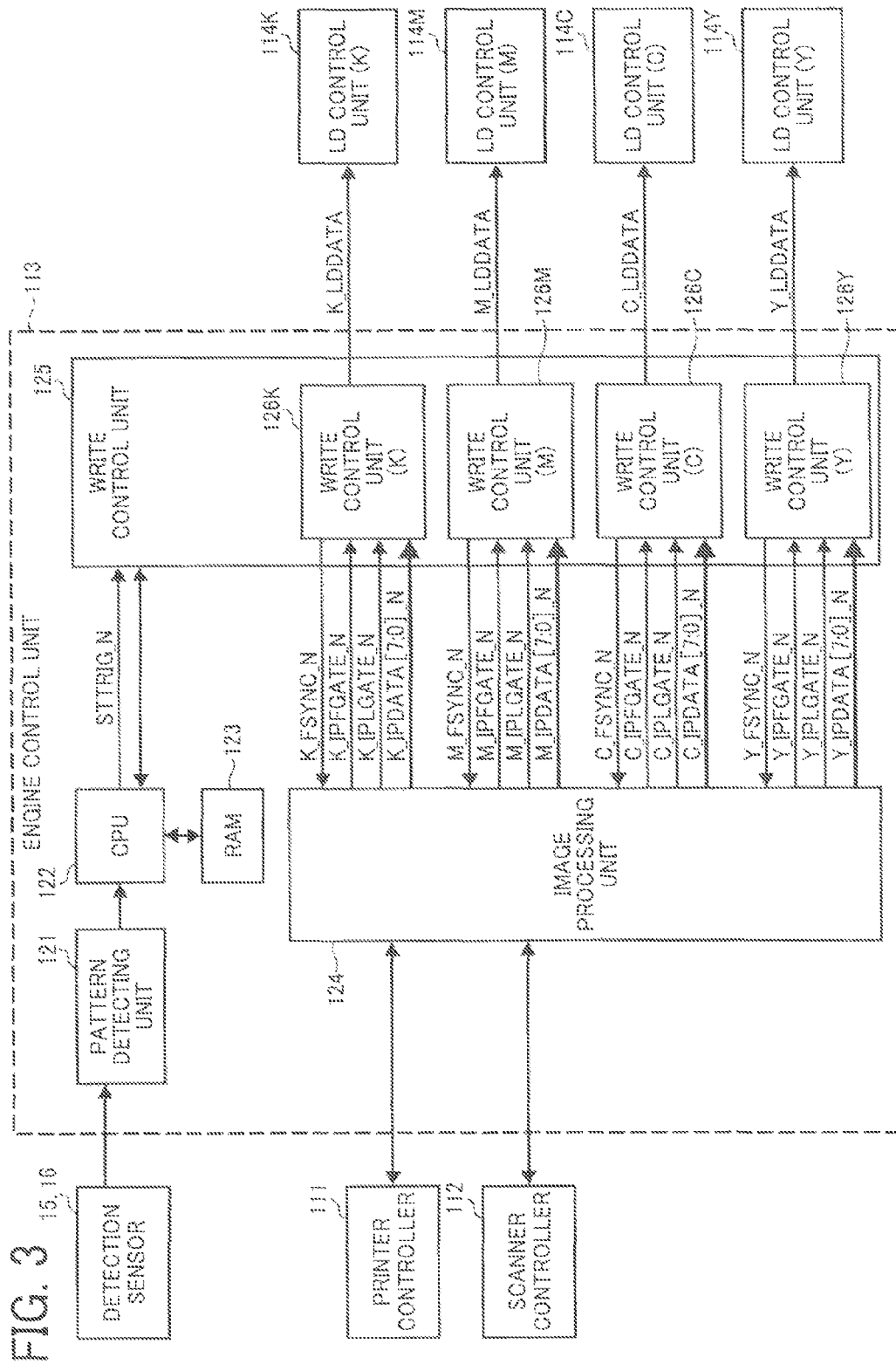

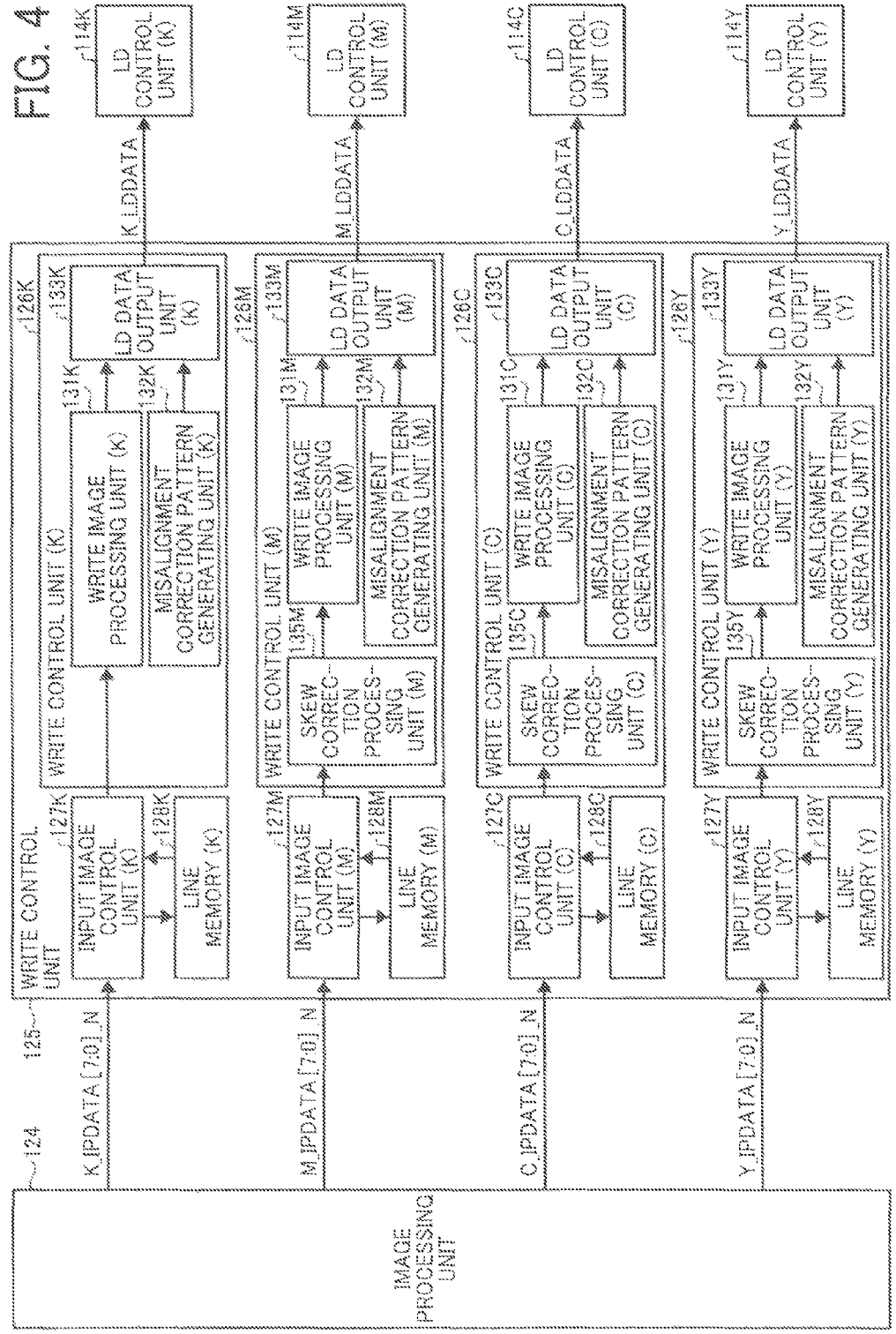

FIG. 5D
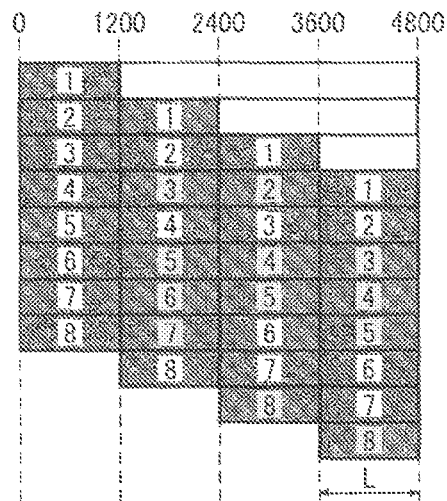
FIG. 5E
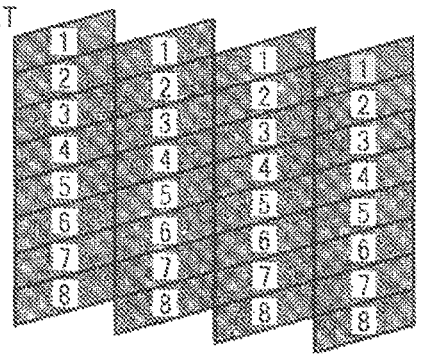
FIG. 5F
DATA FOR SKEW CORRECTION
|  | 1 | 2 | 3 | 4 |
|---|---|---|---|---|
| SHIFT POSITION | 1200 | 2400 | 3600 |  |
| SHIFT DIRECTION | – | – | – |  |

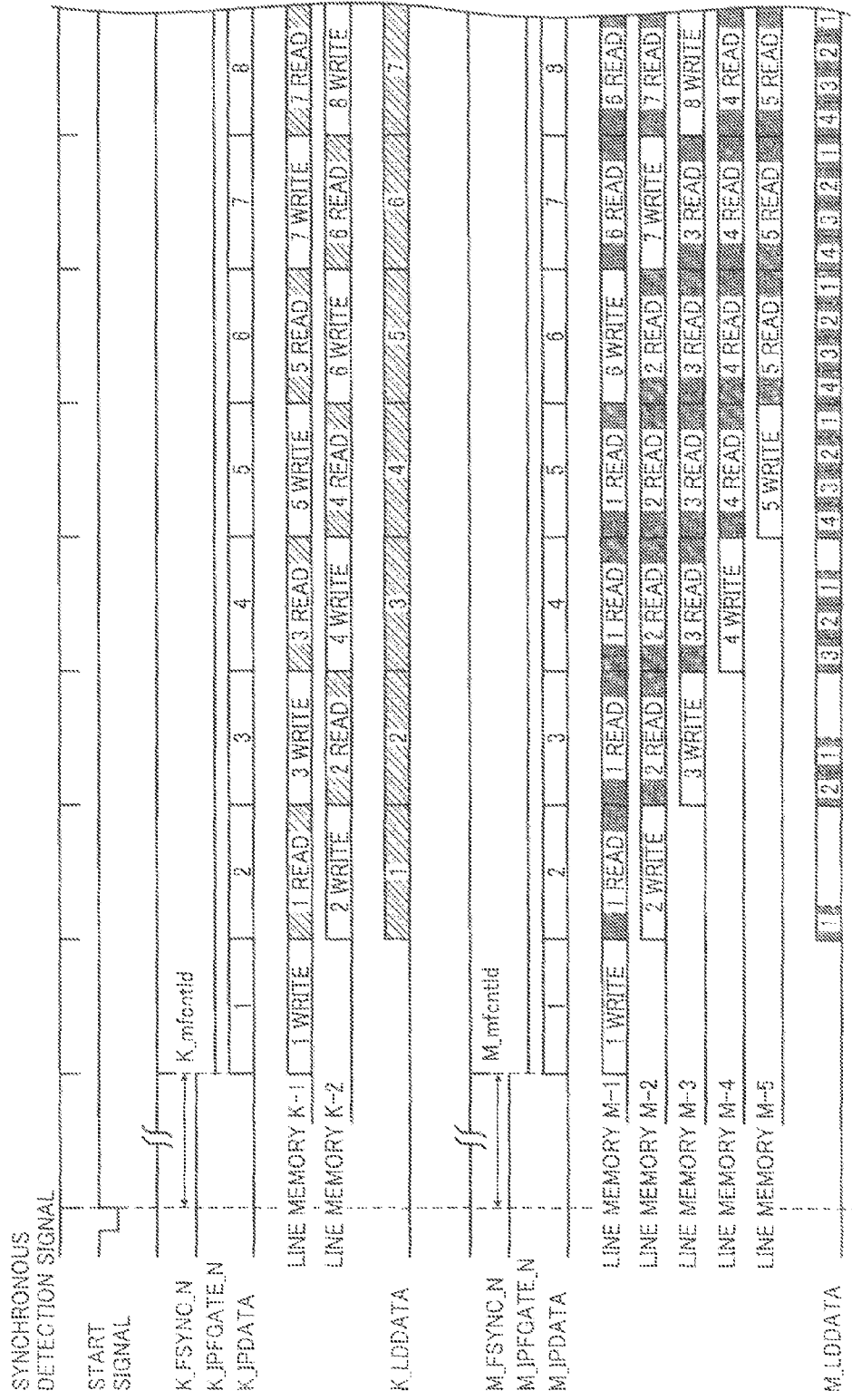

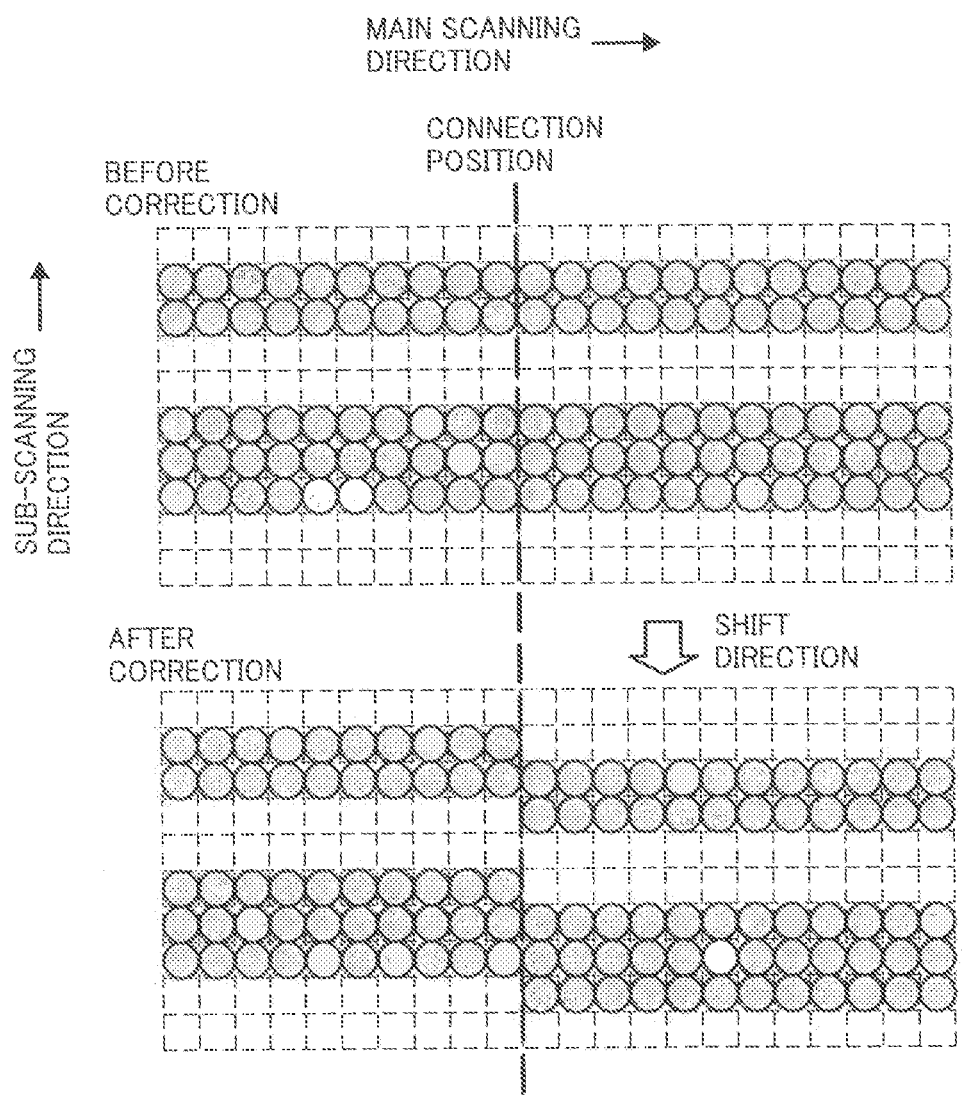

FIG. 10

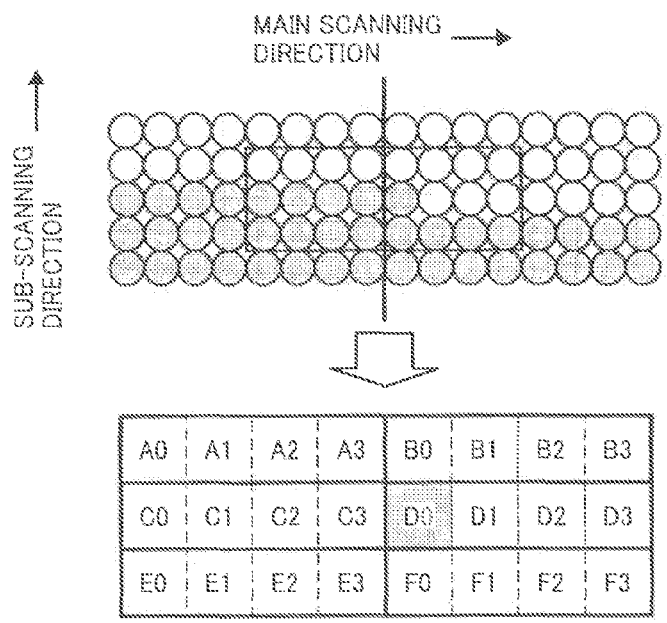

FIG. 11

| CONDITION | CONDITION (1) | CONDITION (2) | CONDITION (3) | CONDITION (4) |
|---|---|---|---|---|
| CONCENTRATION OF AREA A | <Th | ≧Th | <Th | ≧Th |
| CONCENTRATION OF AREA B | <Th | ≧Th | <Th | ≧Th |
| CONCENTRATION OF AREA C | ≧Th | <Th | <Th | ≧Th |
| CONCENTRATION OF AREA D | <Th | ≧Th | ≧Th | <Th |
| CONCENTRATION OF AREA E | ≧Th | <Th | ≧Th | <Th |
| CONCENTRATION OF AREA F | ≧Th | <Th | ≧Th | <Th |
| SHIFT DIRECTION | DIAGONALLY DOWN FROM LEFT TO RIGHT | DIAGONALLY DOWN FROM LEFT TO RIGHT | DIAGONALLY UP FROM LEFT TO RIGHT | DIAGONALLY UP FROM LEFT TO RIGHT |
| IMAGE | | | | |

FIG. 12

| CONDITION | CONDITION (1) | CONDITION (2) | CONDITION (3) | CONDITION (4) |
|---|---|---|---|---|
| CONCENTRATION OF AREA A | <ThL | ≧ThH | <ThL | ≧ThH |
| CONCENTRATION OF AREA B | <ThL | ≧ThH | <ThL | ≧ThH |
| CONCENTRATION OF AREA C | ≧ThH | <ThL | <ThL | ≧ThH |
| CONCENTRATION OF AREA D | <ThL | ≧ThH | ≧ThH | <ThL |
| CONCENTRATION OF AREA E | ≧ThH | <ThL | ≧ThH | <ThL |
| CONCENTRATION OF AREA F | ≧ThH | <ThL | ≧ThH | <ThL |
| SHIFT DIRECTION | DIAGONALLY DOWN FROM LEFT TO RIGHT | DIAGONALLY DOWN FROM LEFT TO RIGHT | DIAGONALLY UP FROM LEFT TO RIGHT | DIAGONALLY UP FROM LEFT TO RIGHT |
| IMAGE | | | | |

PIXEL OF
INTEREST: D

PIXEL OF
INTEREST: D'

PIXEL OF
INTEREST: D''

PIXEL OF
INTEREST: D'''

FIG. 14

| REFERENCE PIXEL | D | D' | D'' | D''' |
|---|---|---|---|---|
| CONCENTRATION OF AREA A | 0<ThL | 0<ThL | 30≧ThH | 45≧ThH |
| CONCENTRATION OF AREA B | 0<ThL | 0<ThL | 0<ThL | 30≧ThH |
| CONCENTRATION OF AREA C | 0<ThL | 30≧ThH | 45≧ThH | 45≧ThH |
| CONCENTRATION OF AREA D | 0<ThL | 0<ThL | 30≧ThH | 30≧ThH |
| CONCENTRATION OF AREA E | 30≧ThH | 45≧ThH | 60≧ThH | 45≧ThH |
| CONCENTRATION OF AREA F | 0<ThL | 30≧ThH | 45≧ThH | 45≧ThH |
| SHIFT DIRECTION | DIAGONALLY DOWN FROM LEFT TO RIGHT | DIAGONALLY DOWN FROM LEFT TO RIGHT | DIAGONALLY DOWN FROM LEFT TO RIGHT | DIAGONALLY DOWN FROM LEFT TO RIGHT |
| DETERMINATION RESULT | NON EDGE | EDGE | NON EDGE | NON EDGE |

FIG. 19

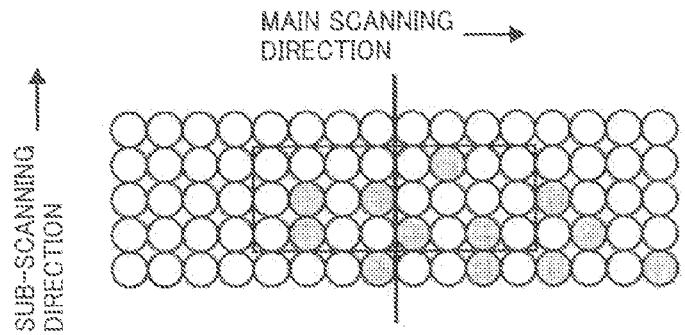

FIG. 20

| CONDITION | CONDITION (1) | CONDITION (2) | CONDITION (3) | CONDITION (4) |
|---|---|---|---|---|
| CONCENTRATION OF AREA A | <ThL | ≧ThH | <ThL | ≧ThH |
| CONCENTRATION OF AREA B | <ThL | ≧ThH | <ThL | ≧ThH |
| CONCENTRATION OF AREA C | ≧ThH | <ThL | <ThL | ≧ThH |
| CONCENTRATION OF AREA D | <ThL | ≧ThH | ≧ThH | <ThL |
| CONCENTRATION OF AREA E | ≧ThH | <ThL | ≧ThH | <ThL |
| CONCENTRATION OF AREA F | ≧ThH | <ThL | ≧ThH | <ThL |
| SUM OF CONCENTRATIONS OF AREAS A TO F | ≧Th_ALL | ≧Th_ALL | ≧Th_ALL | ≧Th_ALL |
| SHIFT DIRECTION | DIAGONALLY DOWN FROM LEFT TO RIGHT | DIAGONALLY DOWN FROM LEFT TO RIGHT | DIAGONALLY UP FROM LEFT TO RIGHT | DIAGONALLY UP FROM LEFT TO RIGHT |
| IMAGE | A B C D E F | A B C D E F | A B C D E F | A B C D E F |

IMAGE FORMING APPARATUS, IMAGE FORMING METHOD, AND COMPUTER PROGRAM PRODUCT THAT PERFORMS SKEW CORRECTION

CROSS-REFERENCE TO RELATED APPLICATIONS

The present application claims priority to and incorporates by reference the entire contents of Japanese Patent Application No. 2009-067127 filed in Japan on Mar. 18, 2009 and Japanese Patent Application No. 2010-058485 filed in Japan on Mar. 15, 2010.

BACKGROUND OF THE INVENTION

1. Field of the Invention

The present invention relates to an image forming apparatus, an image forming method, and a computer program product.

2. Description of the Related Art

Heretofore, because of an increasing demand for high-speed color copiers, tandem-type color copiers have been mostly used in which electrostatic latent image forming units, including photosensitive elements for the four colors, cyan (C), magenta (M), yellow (Y), and black (K), are arranged parallel to one another. In the tandem-type structure, technology for aligning the respective colors is an important issue.

Therefore, most tandem-type color copiers have a function that reduces color deviation by forming predetermined toner patterns on a transfer belt using toner of the respective colors, detecting the toner patterns using optical sensors so as to calculate the amounts of color deviation among the respective colors arisen from different factors such as mis-registration in the main scanning direction and the sub-scanning direction, magnification deviation, or skew, and thus performing feedback correction so that the colors match one another.

Furthermore, this correction process is performed when the power is turned on, when an environment such as temperature changes, or when more than a predetermined number of sheets are printed so that the amount of color deviation is controlled so as to fall within a predetermined range. Among the color deviation amounts, the miss-registration of main/sub scanning direction can be corrected by adjusting the write timing of the laser light projected onto a photosensitive element. The main-scanning magnification can be electrically corrected by adjusting the pixel clock.

A method of mechanical correction and a method for correcting an output image by image processing can be used to improve the skew of laser light that scans with exposure. In the method of mechanical correction, an adjustment mechanism for displacing a mirror inside a laser-light write unit is provided so as to perform correction; however, there are problems in that an actuator such as a mirror displacement motor is necessary for automatic operation, which results in an increase in cost, and the size of the laser-light write unit cannot be reduced.

On the other hand, in the method of correction by image processing, part of an image data is stored in a line memory and the image is read from the line memory while the read position is switched so that an output image is output by being shifted in the direction opposite to the skew, whereby the skew among the respective colors is corrected. In this technique, it is only necessary to add a line memory to an image processing unit in accordance with the correction area; therefore, there is an advantage in that the method can be performed at a relatively low cost compared to the mechanical correction. Furthermore, the method of correction by image processing is also useful as a method for reducing not only skew but also curvature due to the characteristics of a lens inside the laser-light write unit, or the like.

Japanese Patent No. 3715349 (Japanese Patent Application Laid-open No. H09-039294) discloses an image recording apparatus for reducing skew by such image processing. In the image recording apparatus disclosed in Japanese Patent No. 3715349 (Japanese Patent Application Laid-open No. H09-039294), it is detected whether a pixel of interest is in a shift position and, if the pixel pattern around the change point of an adjacent pixel in the main scanning direction at the shift position and the pixel of interest matches a predetermined pattern, the concentration correction corresponding to a combination of the matched pixel pattern and the change position of the adjacent pixel in the main scanning direction is performed on the pixel of interest so that linear noise can be reduced.

However, in the conventional technology, part of an image is stored in a plurality of line memories and the image is read while the read position is switched so that the image divided in the main scanning direction is shifted in the sub-scanning direction to reduce skew among the respective colors; therefore, a line image, which should be originally smooth in the main scanning direction, is shifted by one dot before and after the connection position (division position) at which the image is shifted in the sub-scanning direction, which causes an negative effect such that jaggy is noticeable. That is, in conventional technology, although misalignment itself is reduced, there is a problem in that the smoothness of line images cannot be maintained.

Heretofore, a technology for a smoothing process has been known as a technology for correcting the jaggy of an image. In the smoothing process, the jaggy at the edge portion of a character or a line image is detected by referring to pixels in the vertical and horizontal directions, and a pixel having a size smaller than that of a pixel of an input image is interpolated so as to convert the image into a smooth image. In the smoothing process, a process of matching the input image and a specific pattern is performed on the image and, if the input image matches the pattern, correction is performed to replace the concentration of pixels, whereby the resolution is improved in terms of appearance, and the edge of a character or a line image is made smooth. However, gradation is degraded if the smoothing process is performed on an image that has undergone a halftone process such as a dither image, in which shading is represented in accordance with the degree of density, for example, a photographic image, or the like; therefore, the process is performed on only line image portions, and image areas that have undergone a halftone process are not subjected to the process.

In a monochrome image, the concentration replacement correction by the smoothing process is performed on a portion of a character or a line image that has undergone a binarization process, and such a correction process is not performed on an image such as a dither image that has undergone a halftone process; therefore, it is advantageous that the gradation of the image that has undergone the halftone process is not degraded. However, a character or line image portion of a color image is output in more than two colors in a superimposed manner, for example, a red line is output in yellow and magenta in a superimposed manner, and the halftone process is performed on each color in order to obtain gradation; therefore, they are not subjected to a conventional smoothing process and a jagged portion of a line image cannot be made smooth. That is, if a skew correction is performed on an image that is obtained by performing a halftone process on an input image, it is not possible to make a jagged portion of a line image smooth.

If the smoothing process is performed after the skew correction is performed on an image that is obtained by performing a halftone process on an input image, because the process of matching the input image and the specific pattern is performed during the smoothing process, the correction area of the smoothing process is determined in accordance with the size of the pattern matching. Therefore, the concentration replacement correction is performed only within a limited area. As a result, the smoothing process cannot be sufficiently performed on the jagged portion caused by the skew correction.

SUMMARY OF THE INVENTION

It is an object of the present invention to at least partially solve the problems in the conventional technology.

According to an aspect of the present invention, there is provided an image forming apparatus including: a skew correcting unit that performs skew correction by dividing an input image that has undergone a halftone process into image data in a predetermined skew correction area in a main scanning direction and by shifting the image data in the skew correction area; an edge detecting unit that detects whether a pixel at a division position between the image data after shifting is an edge pixel that constitutes an edge in accordance with concentrations of pixels including the pixel at the division position within a predetermined area and a shift direction of the skew correction; a correction area determining unit that, if it is detected that the pixel at the division position is the edge pixel, determines a correction area that is an area of pixels including the edge pixel to be subjected to concentration correction within the skew correction area; and an edge correcting unit that corrects concentrations of the pixels within the correction area.

According to another aspect of the present invention, there is provided an image forming method performed by an image forming apparatus including: performing skew correction by dividing an input image that has undergone a halftone process into image data in a predetermined skew correction area in a main scanning direction; detecting whether a pixel at a division position in the image data due to the skew correction is an edge pixel that constitutes an edge in accordance with concentrations of pixels including the pixel at the division position within a predetermined area and a shift direction of the skew correction; determining, if it is detected that the pixel at the division position is the edge pixel, a correction area that is an area of pixels including the edge pixel to be subjected to concentration correction within the skew correction area; and correcting concentrations of the pixels within the correction area.

According to still another aspect of the present invention, there is provided a computer program product including a computer-usable medium having computer-readable program codes embodied in the medium for image forming in an image forming apparatus, the program codes when executed causing a computer to execute: performing skew correction by dividing an input image that has undergone a halftone process into image data in a predetermined skew correction area in a main scanning direction; detecting whether a pixel at a division position in the image data due to the skew correction is an edge pixel that constitutes an edge in accordance with concentrations of pixels including the pixel at the division position within a predetermined area and a shift direction of the skew correction; determining, if it is detected that the pixel at the division position is the edge pixel, a correction area that is an area of pixels including the edge pixel to be subjected to concentration correction within the skew correction area; and correcting concentrations of the pixels within the correction area.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a block diagram that illustrates an example of the configuration of a mechanism for performing a write control and a misalignment correction in the color copier;

FIG. 4 is a block diagram that illustrates an example of the configuration of a write control unit;

FIG. 5D is a diagram that illustrates an example of the skew correction method (the method of calculating the skew correction amount);

FIG. 5E is a diagram that illustrates an example of the skew correction method (the method of calculating the skew correction amount);

FIG. 5F is a diagram that illustrates an example of the skew correction method (the method of calculating the skew correction amount);

FIG. 6A is a timing diagram that illustrates a skew correction by line memories;

FIG. 7 is an explanatory diagram that illustrates a stare where a continuous image in the main scanning direction is shifted by one dot, whereby jaggy is noticeable;

FIG. 10 is an explanatory diagram that illustrates a stare where the image is divided into areas;

FIG. 11 is an explanatory diagram that illustrates conditions for determining an edge pixel if a single threshold is used;

FIG. 12 is an explanatory diagram that illustrates conditions for determining an edge pixel if two thresholds are used;

FIG. 14 is an explanatory diagram that illustrates determination results of pixels D, D', D'', and D''' of interest;

FIG. 19 is an explanatory diagram that illustrates an example of an input image according to a second embodiment;

FIG. 20 is an explanatory diagram that illustrates conditions as to whether the sum of concentrations of areas A to F is equal to or more than a reference value according to the second embodiment;

DETAILED DESCRIPTION OF THE PREFERRED EMBODIMENTS

Preferred embodiments of an image forming apparatus, an image forming method, and a computer program product according to the present invention are explained in detail below with reference to the accompanying drawings. An example, where the image forming apparatus according to the present invention is applied to a color copier, is illustrated in the following embodiments. The present invention can be applied to not only a color copier but also a device that performs image processing such as a facsimile machine or a multifunction product that includes a plurality of functions of a scanner, copier, facsimile, printer, and the like that are contained in one casing.

Figure 1:
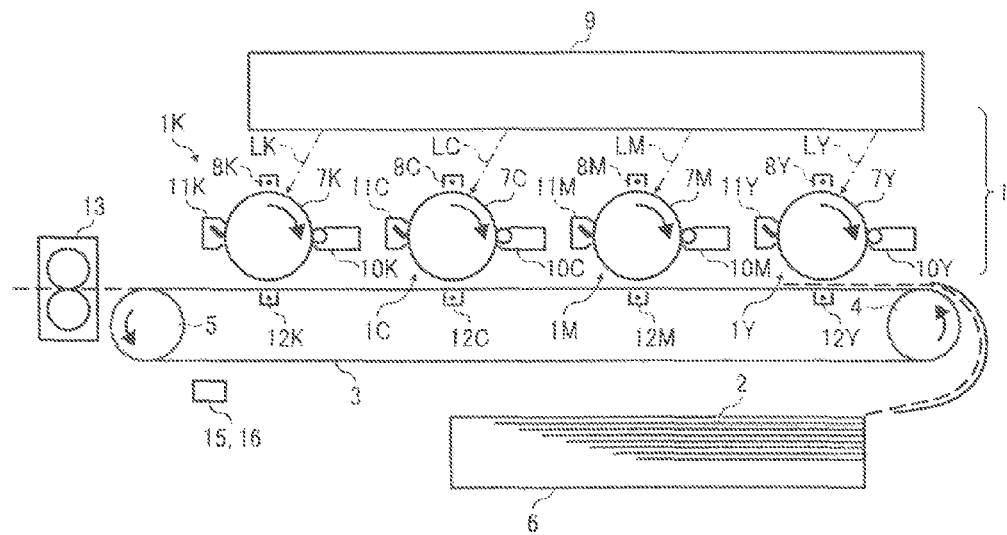
FIG. 1 is an elevation of an image processing unit, an exposure unit, and a transfer belt illustrating the principle for forming images in a color copier.

First, an explanation will be given of the principle for forming images in a color copier according to a first embodiment with reference to FIG. 1. FIG. 1 is an elevation of an image processing unit, an exposure unit, and a transfer belt in order to illustrate the principle for forming images in the color copier. The color copier is an apparatus that forms images on a transfer sheet through image formation using an electrophotographic method.

This color copier has a tandem configuration, where four image forming units 1Y, 1M, 1C, and 1K inside an image processing unit 1 that form images with different colors (Y, M, C, and K) are aligned along a transfer belt 3 that conveys a transfer sheet 2 as a transfer medium. The transfer belt 3 is placed between a drive roller 4, which is driven to rotate, and a follower roller 5, which is rotated in accordance with the drive roller 4, and is driven to rotate in the direction of the arrow in the drawing in accordance with the rotation of the drive roller 4. A feed tray 6 that contains the transfer sheets 2 is disposed under the transfer belt 3. The transfer sheet 2, located at the topmost position among the transfer sheets 2 contained in the feed tray 6, is fed toward the transfer belt 3 during image formation, and then sticks to the transfer belt 3 due to electrostatic attraction. The sticking transfer sheet 2 is conveyed to the image forming unit 1Y, whereby a Y-color image is first formed.

The image forming units 1Y, 1M, 1C, and 1K include photosensitive drums 7Y, 7M, 7C, and 7K, chargers 8Y, 8M, 8C, and 8K, developing devices 10Y, 10M, 100, and 10K, photoconductor cleaners 11Y, 11M, 11C, and 11K, and transfer devices 12Y, 12M, 12C, and 12K, respectively, which are disposed around the photosensitive drums 7Y, 7M, 7C, and 7K.

After the surface of the photosensitive drum 7Y of the image forming unit 1Y is uniformly charged by the charger 8Y, the surface is irradiated with a laser light LY that corresponds to a Y-color image by an exposure unit 9 so that an electrostatic latent image is formed thereon. The formed electrostatic latent image is developed by the developing device 10Y, whereby a toner image is formed on the photosensitive drum 7Y. The toner image is transferred onto the transfer sheet 2 by the transfer device 12Y at the position (transfer position) where the photosensitive drum 7Y is in contact with the transfer sheet 2 on the transfer belt 3, whereby a single-color (Y-color) image is formed on the transfer sheet 2. After the transfer is complete, unnecessary toner remaining on the surface of the photosensitive drum 7Y is removed by the photoconductor cleaner 11Y, and then the photosensitive drum 7Y stands by for subsequent image formation.

Thus, the transfer sheet 2, onto which the single-color (Y-color) image has been transferred by the image forming unit 1Y, is conveyed to the image forming unit 1M by the transfer belt 3. In the same manner, an M-color toner image formed on the photosensitive drum 7M is transferred onto the transfer sheet 2 in a superimposed manner. The transfer sheet 2 is then sequentially conveyed to the image forming unit 1C, and the image forming unit 1K and, in the same manner, the formed C-color and K-color toner images are transferred onto the transfer sheet 2, whereby a color image is formed on the transfer sheet 2.

The transfer sheet 2, which has passed through the image forming unit 1K and on which the color image has been formed, is separated from the transfer belt 3 and, after the color image is fixed by a fixing device 13, the transfer sheet 2 is discharged.

Alignment of the respective colors is important to the tandem-type color copier because of its structure. The color deviation of the respective colors includes mis-registration in the main scanning direction (the direction parallel to the rotation axes of the photosensitive drums 7K, 7M, 7C, and 7Y), mis-registration in the sub-scanning direction (the direction perpendicular to the rotation axes of the photosensitive drums 7K, 7M, 7C, and 7Y), deviation in the main-scanning magnification, skew, and the like. In this color copier, mis-alignment correction of the respective colors is performed by using correction patterns prior to any actual color image forming operation performed on the transfer sheet 2.

Figure 2:
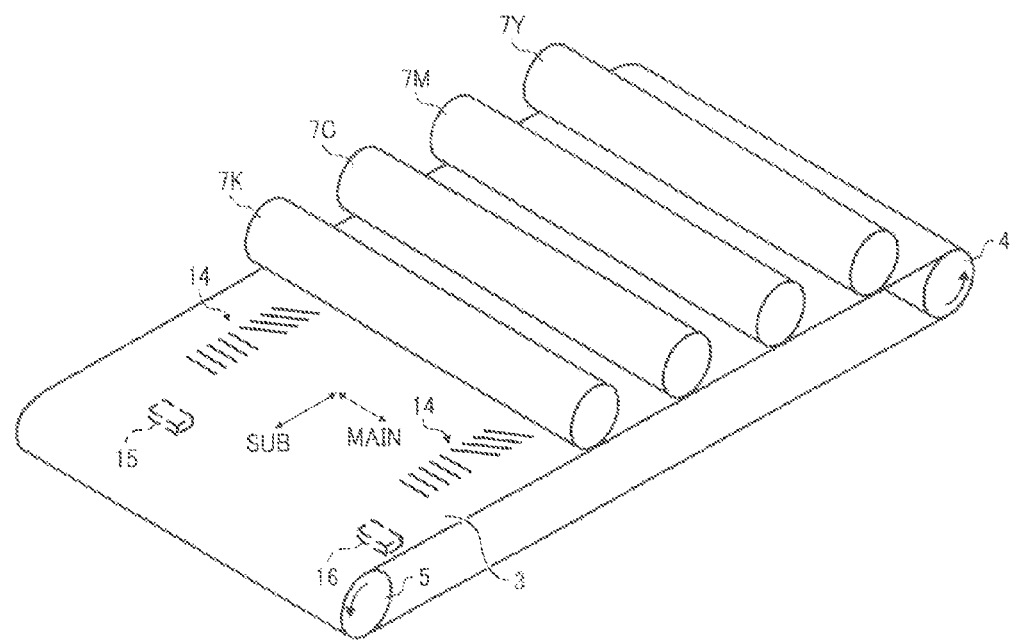
FIG. 2 is a perspective view of the transfer belt illustrating a state where correction patterns are formed.

FIG. 2 is a perspective view of the transfer belt illustrating a state where correction patterns are formed. In the color copier, for the misalignment correction, correction patterns 14 used for color deviation correction of the respective colors are formed on the transfer belt 3 by the image forming units 1Y, 1M, 1C, and 1K. The correction patterns are detected by a plurality of detection sensors 15 and 16. In the example of FIG. 2, the plurality of detection sensors 15 and 16 are disposed on both ends of the transfer belt 3 in the main scanning direction. The correction patterns 14 are formed on the transfer belt 3 corresponding to the placement positions of the respective detection sensors 15 and 16. The transfer belt 3 is moved in the conveying direction indicated in FIG. 2 so as to sequentially pass the detection sensors 15 and 16, whereby the correction patterns 14 are detected. Upon detection of the correction patterns 14, calculation processes are performed to calculate various deviation amounts (main-scanning magnification deviation amount, main-scanning mis-registration amount, sub-scanning mis-registration amount, skew amount, and distortion amount) by using the detection results. The correction amounts for the respective deviation components are calculated from the color deviation amounts.

Next, an explanation will be given of blocks and their operations relating to a control operation of the color copier. FIG. 3 is a block diagram that illustrates an example of the configuration of a mechanism for performing a write control and a misalignment correction in the color copier. Processing units that perform a misalignment correction process in the color copier include the detection sensors 15 and 16, a printer controller 111, a scanner controller 112, an engine control unit 113, and Laser Diode (LD) control units 114K, 114M, 114C, and 114Y for the respective colors of K, M, C, and Y.

The detection sensors 15 and 16 detect the correction patterns 14 transferred onto the transfer belt 3 in order to calculate misalignment of respective color images. The detection sensors 15 and 16 detect the positions of the correction patterns 14 and output analog detection signals to the engine control unit 113.

The printer controller 111 receives image data that is transmitted from an external device (for example, a personal computer (hereinafter, referred to as a "PC") via a network. The printer controller 111 sends the received image data to an image processing unit 124.

The scanner controller 112 acquires images of an original read by an undepicted scanner. The scanner controller 112 sends the acquired image data to the image processing unit 124.

The engine control unit 113 includes, broadly speaking, a pattern detecting unit 121, a Central Processing Unit (CPU) 122, a Random Access Memory (RAM) 123, the image processing unit 124, and a write control unit 125.

The pattern detecting unit 121 amplifies detection signals output from the detection sensors 15 and 16, converts the amplified analog detection signals into digital data, and stores the converted digital data in the RAM 123.

The CPU 122 calculates a color deviation amount from the digital data, which is stored in the RAM 123 and is based on the detection signals of the positions of the correction patterns 14, and calculates a color deviation correction amount for correcting the color deviation from the calculated color deviation amount. The color deviation amount includes: the distortion amount of each color, the magnification error amount in the main scanning direction, the misregistration amount in the main scanning direction and the misregistration amount in the sub-scanning direction (hereinafter, referred to as the "main/sub misregistration amount"), the skew amount, and the like. Furthermore, the color deviation correction amount includes, on the basis of these various deviation amounts: the distortion correction amount of each color, the main-scanning magnification correction amount, the main-scanning direction registration correction amount and the sub-scanning direction registration correction amount (hereinafter, referred to as the "main/sub registration correction amount"), the skew correction amount, and the like.

On the basis of the resolution of image data and the calculated distortion amounts of the respective colors (Y, M, C, and K), the CPU 122 calculates distortion line amounts of the Y, M, and C colors in the case where the K color is a reference color and determines the number of lines of a line memory in accordance with the distortion line amounts of the respective colors with respect to the reference color. The reference color means a color at a reference position for calculating the distortion amount of each color and, in this example, the K color is the reference color.

The RAM 123 temporarily stores therein digital data on the correction patterns 14 acquired from the pattern detecting unit 121 via the CPU 122. A configuration may be such that a non-volatile memory is substituted for the RAM 123 and the digital data on the correction patterns 14 is stored in the nonvolatile memory.

The image processing unit 124 performs various types of image processing in accordance with each set of image data received by the printer controller 111 or each set of image data acquired from the scanner controller 112. Furthermore, the image processing unit 124 receives a sub-scanning timing signal (K, M, C, Y)_FSYNC_N for each color sent from the write control unit 125 and sends to the write control unit 125 a main-scanning gate signal (K, M, C, Y)_IPLGATE_N for each color, a sub-scanning gate signal (K, M, C, Y)_IPFGATE_N, and an image signal (K, M, C, Y)_IPDATA_N that is in accordance with these synchronous signals.

The write control unit 125 receives the image data sent from the image processing unit 124, performs various write processes on the received image data so as to generate an image signal (K, M, C, Y)_LDDATA, and sends it to each of the LD control units 114K, 114M, 114C, and 114Y.

The LD control units 114K, 114M, 114C, and 114Y are arranged within the exposure unit 9 and control the irradiation of the laser lights LY, LM, LC, and LK onto the photosensitive drums 7Y, 7M, 7C, and 7K by the exposure unit 9. The irradiation of the laser lights LY, LM, LC, and LK causes toner images to be formed on the photosensitive drums 7Y, 7M, 7C, and 7K. The formed toner images are transferred onto the transfer sheet 2 and are output.

An explanation will be given of brief overview of the color image forming process performed by the color copier. A printer image from the PC and a copy image are processed by the printer controller 111 and the scanner controller 112, respectively, and sent to the image processing unit 124 of the engine control unit 113. The image processing unit 124 performs various types of image processing in accordance with each set of image data. After converting into image data for each color, the image processing unit 124 sends it to the write control unit 125. The write control unit 125 generates a print timing for each color, receives image data in accordance with the sub-scanning timing, performs various types of write image processing, and then converts the data into LD emission data. The LD control units 114K, 114M, 114C, and 114Y cause the LDs for the respective colors to emit light, whereby images are formed on the photosensitive drums.

A further explanation will be given of the write control unit 125 in the engine control unit 113 with reference to FIG. 4. FIG. 4 is a block diagram that illustrates an example of the configuration of the write control unit. The write control unit 125 includes, broadly speaking, write control units 126K, 126M, 126C, and 126Y for the respective colors K, M, C, and Y, input image control units 127K, 127M, 127C, and 127Y, and line memories 128K, 128M, 128C, and 128Y.

Further, the write control unit 126K for the reference color K includes a write image processing unit 131K, a misalignment correction pattern generating unit 132K, and an LD data output unit 133K. Moreover, the write control units 126M, 126C, and 126Y for the other colors M, C, and Y include skew correction processing units 135M, 135C, and 135Y in addition to write image processing units 131M, 131C, and 131Y, misalignment correction pattern generating units 132M, 132C, and 132Y, and LD data output units 133M, 133C, and 133Y, which have the same configurations as for the K color.

In FIG. 4, in order to simplify the explanation, the three signals, i.e., the main-scanning gate signal (K, M, C, Y)_IPLGATE_N for each color, the sub-scanning gate signal (K, M, C, Y)_IPFGATE_N, and the image signal (K, M, C, Y)_IPDATA_N that is in accordance with these synchronous signals illustrated in FIG. 3 are collectively represented as a write control signal (K, M, C, Y)_IPDATA[7:0]_N.

The write image processing units 131K, 131M, 131C, and 131Y perform various types of image processing by using image data stored in the line memories 128K, 128M, 128C, and 128Y, respectively.

The misalignment correction pattern generating units 132K, 132M, 132C, and 132Y generate image data on the correction patterns 14 to be transferred onto the transfer belt 3 in order to calculate correction values to correct color deviations of the respective colors on the transfer belt 3.

The LD data output units 133K, 133M, 133C, and 133Y send correction write commands (LDDATA) to the LD control units 114K, 114M, 114C, and 114Y in accordance with the main/sub registration correction amounts calculated by the CPU 122, thereby controlling the deviation correction of write timings due to laser light irradiation. Moreover, the LD data output units 133K, 133M, 133C, and 133Y send change commands (LDDATA) for the image frequency to the LD control units 114K, 114M, 114C, and 114Y in accordance with the main-scanning magnification correction amount calculated by the CPU 122, thereby controlling the magnification-error correction in the main scanning direction. Furthermore, the LD data output units 133K, 133M, 133C, and 133Y send, to the LD control units 114K, 114M, 114C, and 114Y, commands (LDDATA) for forming the correction patterns 14 acquired from the misalignment correction pattern generating units 132K, 132M, 132C, and 132Y, respectively, on the transfer belt 3. Moreover, the LD data output units 133K, 133M, 133C, and 133Y include for each of the colors a device that can set a highly detailed output frequency, for example, a clock generator that uses a Voltage Controlled Oscillator (VCO), or the like.

The input image control units 127K, 127M, 127C, and 127Y receive image data sent from the image processing unit 124: store the received image data in the line memories 128K, 128M, 128C, and 128Y: and send the stored image data to the write control units 126K, 126M, 126C, and 126Y for the respective colors. Further, the input image control units 127K, 127M, 127C, and 127Y store data in the line memories 128K, 128M, 128C, and 128Y for the respective colors in accordance with the distortion line amounts calculated by the CPU 122. The input image control units 127K, 127M, 127C, and 127Y according to the present embodiment receive one-bit image data on a binary image from the image processing unit 124, and send the received image data to the write control units 126K, 126M, 126C, and 126Y. Although the image data on the binary image is sent to the write control units 126K, 126M, 126C, and 126Y according to the present embodiment, the present invention is not limited to this. For example, the image data on the binary image can be converted into image data that has a 4-bit concentration value (0(=white pixel) to 15(=black pixel)) and sent to the write control units 126K, 126M, 126C, and 126Y.

The line memories 128K, 128M, 128C, and 128Y are memories for sequentially storing image data sent from the image processing unit 124.

The skew correction processing units 135M, 135C, and 135Y perform skew correction on image data using the K color as a reference. In the present embodiment, image data (image) in the sub-scanning direction is divided into a plurality of sections in each line in the main scanning direction, the divided image data in each line in the main scanning direction is stored in the line memories 128M, 128C, and 128Y, the image data in each line in the main scanning direction is divided in each skew correction area, and the divided image data is shifted in the sub-scanning direction that is opposite to the skew and then output. Thus, the skew that occurs during formation of toner images is corrected. In the following description, an explanation will be given of an image write process performed by the write control units 126K, 126M, 126C, and 126Y in detail.

First, an explanation will be given of the image write process for the K color in FIG. 4. The image signal K_IPDATA [7:0]_N is first sent from the image processing unit 124 to the input image control unit 127K. The input image control unit 127K temporarily stores the image signal in the line memory 128K while sending the image signal to the write control unit 126K. In the write control unit 126K, the write image processing unit 131K sends the image signal sent from the input image control unit 127K to the LD data output unit 133K. The LD data output unit 133K generates the image signal K_LDDATA for writing the K color and sends it to the LD control unit 114K.

Next, an explanation will be given of the image write process for the M, C, and Y colors in FIG. 4. The image signal (M, C, Y)_IPDATA[7:0]_N is first sent from the image processing unit 124 to the input image control units 127M, 127C, and 127Y. The input image control units 127M, 127C, and 127Y then temporarily store the image signals in the line memories 128M, 128C, and 128Y in order to perform the skew amount correction in accordance with the skew correction amount stored in the RAM 123. After performing the skew amount correction process on the temporarily stored image signals in accordance with the skew correction amount, the skew correction processing units 135M, 135C, and 135Y send the respective image signals to the write image processing units 131M, 131C, and 131Y. In the same manner as the operation for the K color, the LD data output units 133M, 133C, and 133Y for the respective colors, which have received the image signals from the write image processing units 131M, 131C, and 131Y for the respective colors, generate the write image signals (M, C, Y)_LDDATA and send them to the LD control units 114M, 114C, and 114Y for the respective colors.

For output of the misalignment correction patterns 14, pattern image signals for the K, M, C, and Y colors are sent from the misalignment correction pattern generating units 132K, 132M, 132C, and 132Y to the LD data output units 133K, 133M, 133C, and 133Y for the respective colors. Afterwards, the same operation as described above is performed.

As described above, alignment of the respective colors K, M, C, and Y needs to be performed in order to form a color image. The misalignment correction process is performed by using a well-known method. In the present embodiment, the misalignment correction process is performed by using the K color as the reference color. The reference color is a color used as the reference for correction, and the other colors are aligned to the reference color so that the misalignment of the respective colors is corrected.

The brief overview of the misalignment correction process is as follows; first, the misalignment correction patterns, which are generated by the misalignment correction pattern generating units 132K, 132M, 132C, and 132Y in the write control units 126K, 126M, 126C, and 126Y for the respective colors in FIG. 4, are formed on the transfer belt 3; and then the correction patterns 14 formed on the transfer belt 3 are detected by the detection sensors 15 and 16. Then, after the correction patterns 14 detected by the pattern detecting unit 121 are converted into digital data, the CPU 122 calculates the main-scanning magnification correction amount, the main registration correction amount, and the sub registration correction amount with respect to the reference color (K color) from the correction patterns that have been converted into digital data. At the same time, the skew correction amount for each color with respect to the reference color (the K color) is calculated, and a division position in the main scanning direction and the correction direction are calculated in order to perform skew correction. Information that contains the calculated main-scanning magnification correction amount, the main registration correction amount, the sub registration correction amount, the skew correction amount, and the main-scanning division position and the correction direction for skew correction is stored in the RAM 123 (or a nonvolatile memory), and then the misalignment correction process is terminated. The correction amounts stored in the RAM 123 are used as the correction amounts upon printing until a subsequent misalignment correction process is performed. Afterward, the print process is performed.

The pixel clock frequency are set in the print process for each of the colors K, M, C, and Y, the main-scanning delay amount for each color, the sub-scanning delay amount for each color, and the skew correction amounts for the M, C, and Y colors with respect to the reference color (K color). The skew correction is performed in accordance with the set main-scanning pixel clock frequency for each of the colors K, M, C, and Y, the main-scanning delay amount, the sub-scanning delay amount, and the skew correction amount while the print operation is performed. The skew correction process is performed by the skew correction processing units 135M, 135C, and 135Y using a well-known method.

The color deviation correction in the main scanning direction is performed by using a well-known method by correcting the main-scanning magnification and the main-scanning write timing. The main-scanning magnification correction is performed by changing the image frequency in accordance with the magnification error amount for each color detected by the write control unit 125. The write control unit 125 includes a device that can set a highly detailed frequency, for example, a clock generator that uses a VCO, or the like. Furthermore, the write timing in the main scanning direction is adjusted in accordance with the position of a main-scanning counter, which is operated using a synchronous detection signal for each color as a trigger, when the LD outputs data.

Further, the color deviation correction in the sub-scanning direction is performed using a well-known method by adjusting the write timing in the sub-scanning direction. Specifically, the write control unit 125 counts the line number using the start signal STTRIG_N from the CPU 122 as a reference and outputs the sub-scanning timing signal (Y, M, C, K)_FSYNC_N to the image processing unit 124. Afterwards, the image processing unit 124 outputs the sub-scanning gate signal (Y, M, C, K)_IPFGATE_N to the write control unit 125 using the reception of the sub-scanning timing signal (Y, M, C, K)_FSYNC_N as a trigger and sends the image data (Y, M, C, K)_IPDATA[7:0]_N. The write control units 126Y, 126M, 126C, and 126K for the respective colors then send the image signal (Y, M, C, K) LDDATA to the LD control units 114Y, 114M, 114C, and 114K.

If the registration in the sub-scanning direction is to be corrected, the sub-scanning delay amount (Y, M, C, K)_mfcntld from the start signal is changed in accordance with the detected misalignment amount. Usually, the misalignment amount, obtained using the K color as a reference, is reflected on the sub-scanning delay amount for the color (M, C, Y). The timing of (Y, M, C, K)_FSYNC_N is changed, whereby the alignment in the sub-scanning direction is performed.

Figure 5A:
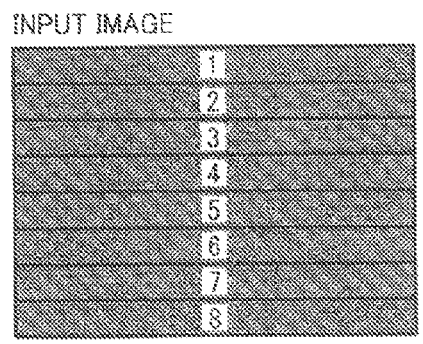
FIG. 5A is a diagram that illustrates an example of a skew correction method (a method of calculating a skew correction amount)
Figure 5B:
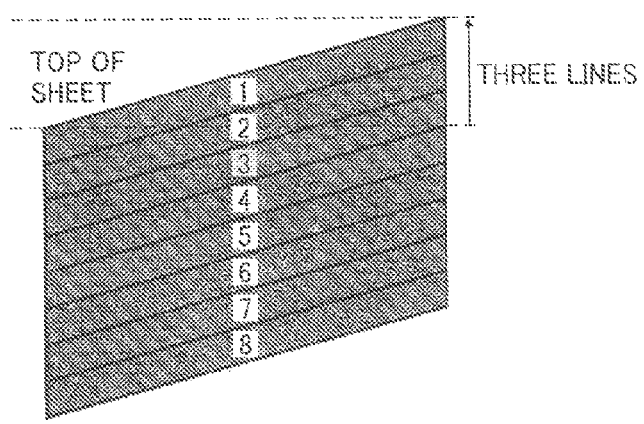
FIG. 5B is a diagram that illustrates an example of the skew correction method (the method of calculating the skew correction amount)

FIG. 5A to FIG. 5F are diagrams that illustrate an example of the skew correction method (the method of calculating the skew correction amount). FIG. 5A is a diagram that illustrates an input image corresponding to eight lines. One line represents an image stored in a single line memory. FIG. 5B is a diagram that illustrates a state where the skew is not corrected and the input image illustrated in FIG. 5A is output as LD data without change. As illustrated in this figure, if the input image is output as LD data without change, the right side of the image deviates on the sheet in an upward direction corresponding to three lines compared to FIG. 5A due to the skew of the scanning beam (that is, the line number of the skew amount is 3).

Figure 5C:
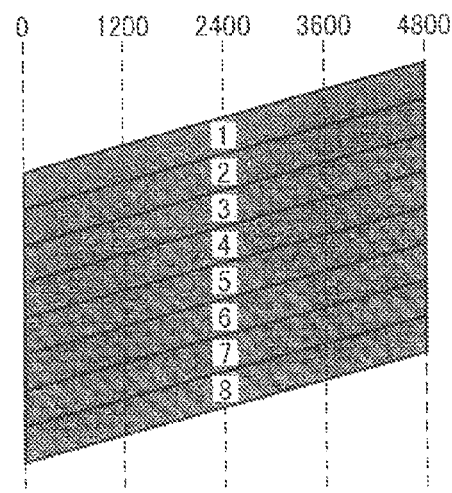
FIG. 5C is a diagram that illustrates an example of the skew correction method (the method of calculating the skew correction amount)

Thus, if the right side of the image deviates in an upward direction by three lines, as illustrated in FIG. 5C, the line in the main scanning direction is to be equally divided into [(the line number of the skew amount)+1], i.e., four (4). The position (division position) at which the line in the main scanning direction is divided is referred to as a shift position, and an area of the line in the main scanning direction divided at the shift position is referred to as a shift area. Furthermore, the width L of the shift area is referred to as a skew correction area.

As illustrated in FIG. 5D, if the image is output such that the image is shifted by one line in a downward direction each time moving to the shift area on the right side, as illustrated in FIG. 5E, the position of the image on the right and left sides can be parallel on the sheet. Specifically, part of the image is stored in the line memory and read by changing the read position, and the image (the shift area) divided in the main scanning direction is shifted in the sub-scanning direction so that skew for each color is corrected. The shift in the sub-scanning direction is referred to as shift.

The configuration is such that, for actual skew correction, input image data is sequentially stored in the line memory for skew correction and the line memories 128K, 128M, 128C, or 128Y from which data is read is switched by the skew correction processing units 135M, 135C, and 135Y in each divided area so that the image illustrated in FIG. 5D is output. Therefore, as illustrated in FIG. 5F, information on an address of the shift position in the main scanning direction for each color and information as to whether the shift is performed at the shift position in a plus (+) direction or a minus (−) direction along the sub-scanning direction are obtained. The information that contains the address of the shift position in the main scanning direction and the shift direction, either the plus (+) direction or the minus (−) direction along the sub-scanning direction at each shift position, is referred to as shift correction information.

Although FIG. 5A to FIG. 5E illustrate the skew correction method performed if the left side of the image deviates on the sheet by three lines in a downward direction from the normal position without the skew correction performed on the input image, the skew correction also is performed by the same process if the right side of the image deviates on the sheet in a downward direction from the normal position without the skew correction performed on the input image. In this case, the skew correction processing units 135M, 135C, and 135Y equally divide the input image in the main scanning direction and shift the shift area in an upward direction by the corresponding number of lines, each time moving to the shift area on the right side.

Figure 6B:
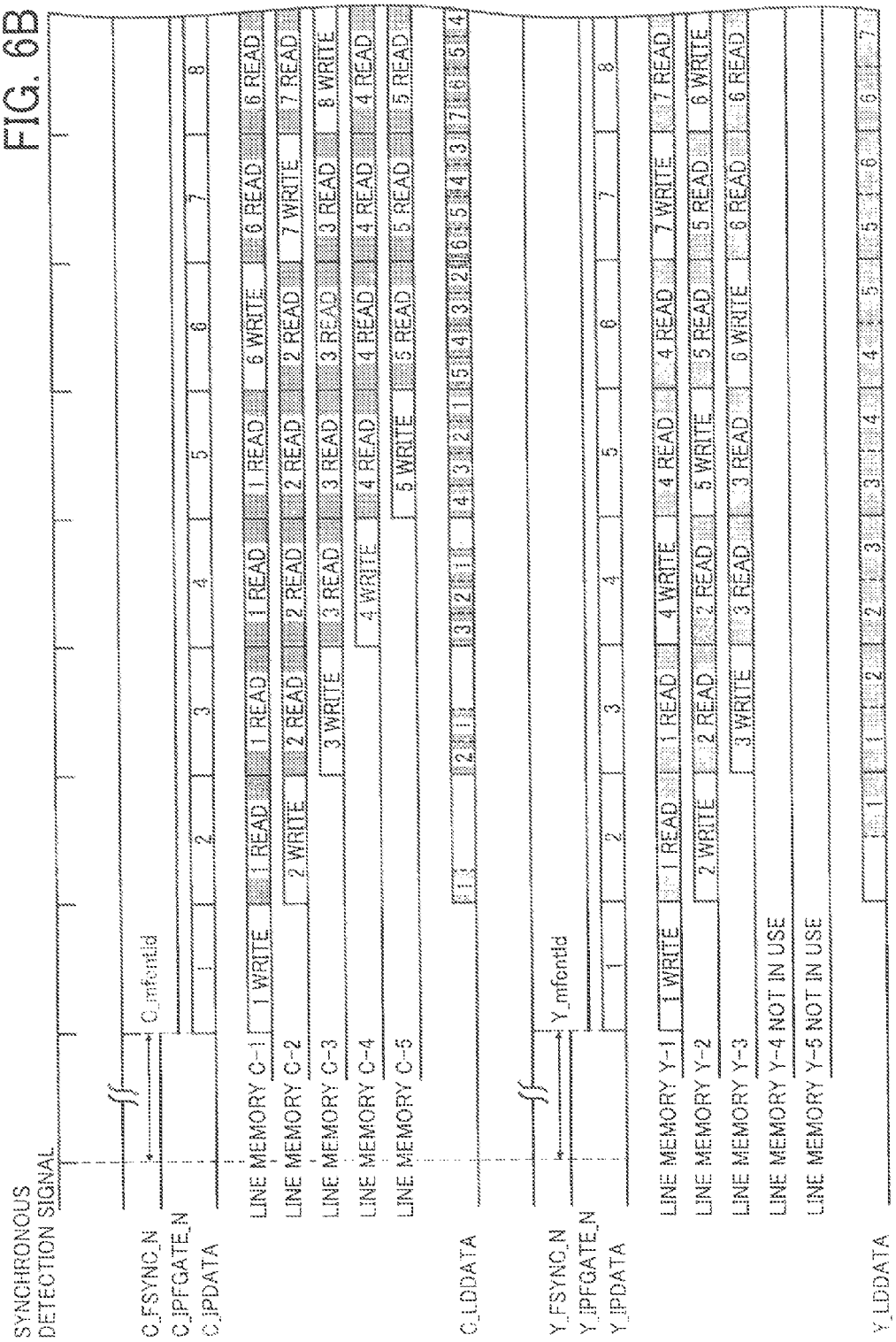
FIG. 6B is a timing diagram that illustrates the skew correction by the line memories.

FIG. 6A and FIG. 6B are timing diagrams that illustrate the skew correction by the line memories. It is assumed that no division is performed for the K color because it is the reference color. The four-division correction is performed for the M and C colors because the skew correction amount is three dots, and the two-division correction is performed for the Y color because the skew correction amount is one dot. An explanation is omitted for the timing diagram during the skew correction because it is the same as a well-known method.

Although the configuration in the present embodiment is such that the individual line memories 128K, 128M, 128Y, and 128C are provided for the respective colors, a configuration can be adopted such that only one line memory is provided and commonly used for the colors.

Because of such successive image processing, even if the skew among the respective colors occurs, the skew correction process is performed so that the color deviation due to the skew can be reduced and the image quality can be improved.

The skew correction processing units 135M, 135C, and 135Y according to the present embodiment perform correction such that a jagged portion (see FIG. 7) of a line image, which is caused due to the skew correction performed on a color image, is unnoticeable.

Figure 8:
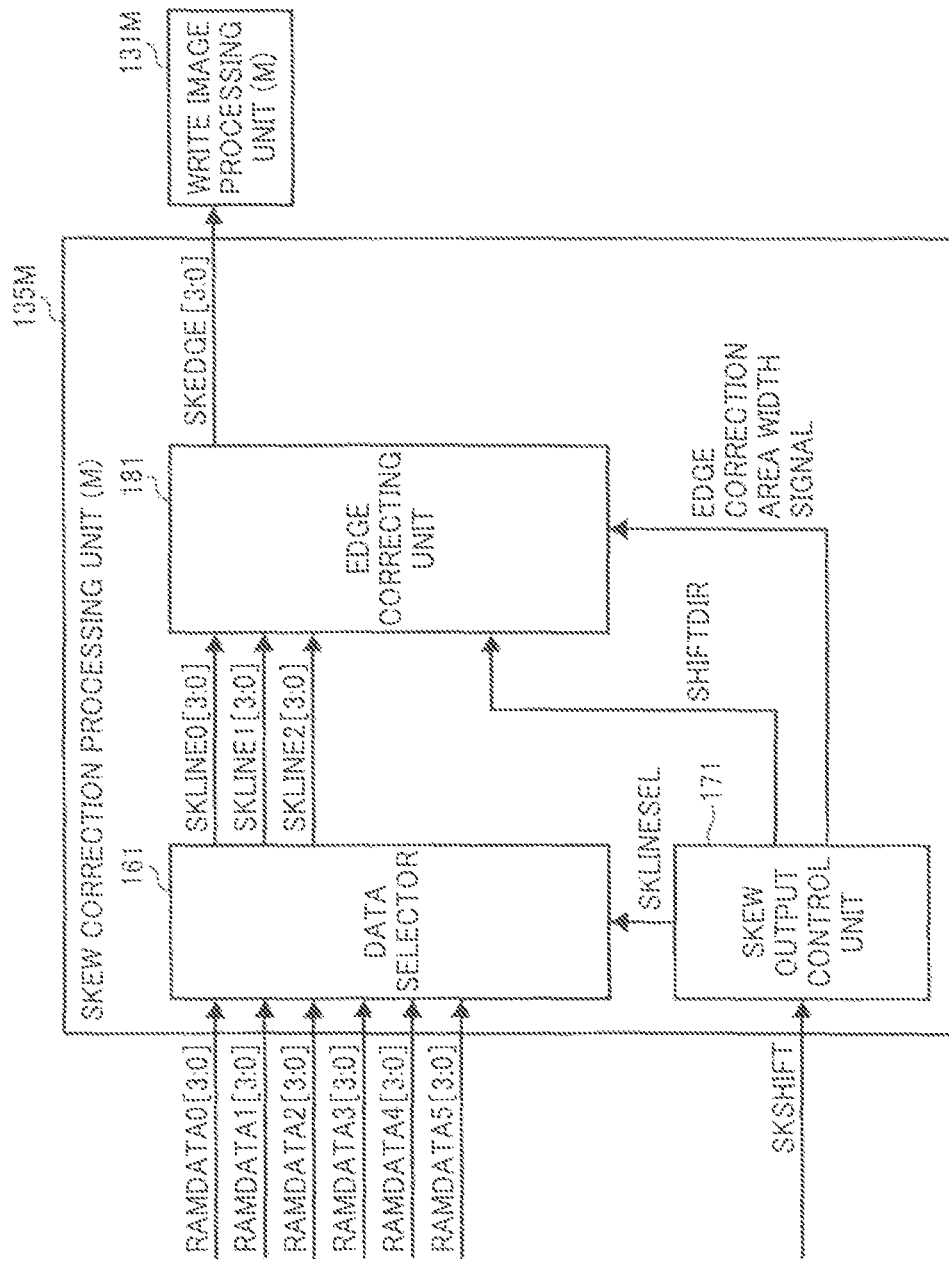
FIG. 8 is a block diagram that illustrates the functional structure of a skew correction processing unit.

FIG. 8 is a block diagram that illustrates the functional structure of the skew correction processing unit 135M. Although the functional structure of the skew correction processing unit 135M for magenta (M) color is illustrated in FIG. 8, the same applies for the skew correction processing units 135Y and 135C for the other colors.

The skew correction processing unit 135M includes a data selector 161, a skew output control unit 171, and an edge correcting unit 181.

The data selector 161 selects image data sent from an input image control unit 127 and sends it to the edge correcting unit 181. Specifically, the data selector 161 outputs a total of three lines, i.e., the designated line, one line above it, and one line below it, to the edge correcting unit 181 at the subsequent stage. The line to be selected and output by the data selector from the plurality of lines is determined by using information form the skew output control unit 171.

The skew output control unit 171 outputs a selection signal (SKLINESEL) in accordance with the connection position (division position) and the shift direction (SKSHIFT) at the skew correction determined by the misalignment detection process, as well as performing the above-described skew correction process. Moreover, the skew output control unit 171 outputs an edge correction area width signal to the edge correcting unit 181. The edge correcting unit 181 determines the correction area in accordance with the input edge correction area width signal, performs the edge correction on the input image data, and outputs it to the write image processing unit 131M. The edge correction area width signal is a signal indicative of an edge correction area width that includes the number of pixels as a unit of edge correction (concentration correction).

Although, in FIG. 8, the configuration is such that the correction process is performed by using a total of three lines, i.e., which are composed of the line designated by the edge correcting unit 181, the line above it, and the line below it. The data in the three lines is configured to be input to the edge correcting unit 181, but another configuration can be such that the line number to be output is any value equal to or more than two in accordance with a process performed by the edge correcting unit 181.

The edge correcting unit 181 performs the correction process on an edge portion by using image data corresponding to three lines input from the data selector 161. The correction process on the edge portion includes the edge detection process, the correction area determination process, and the concentration correction process.

Figure 9:
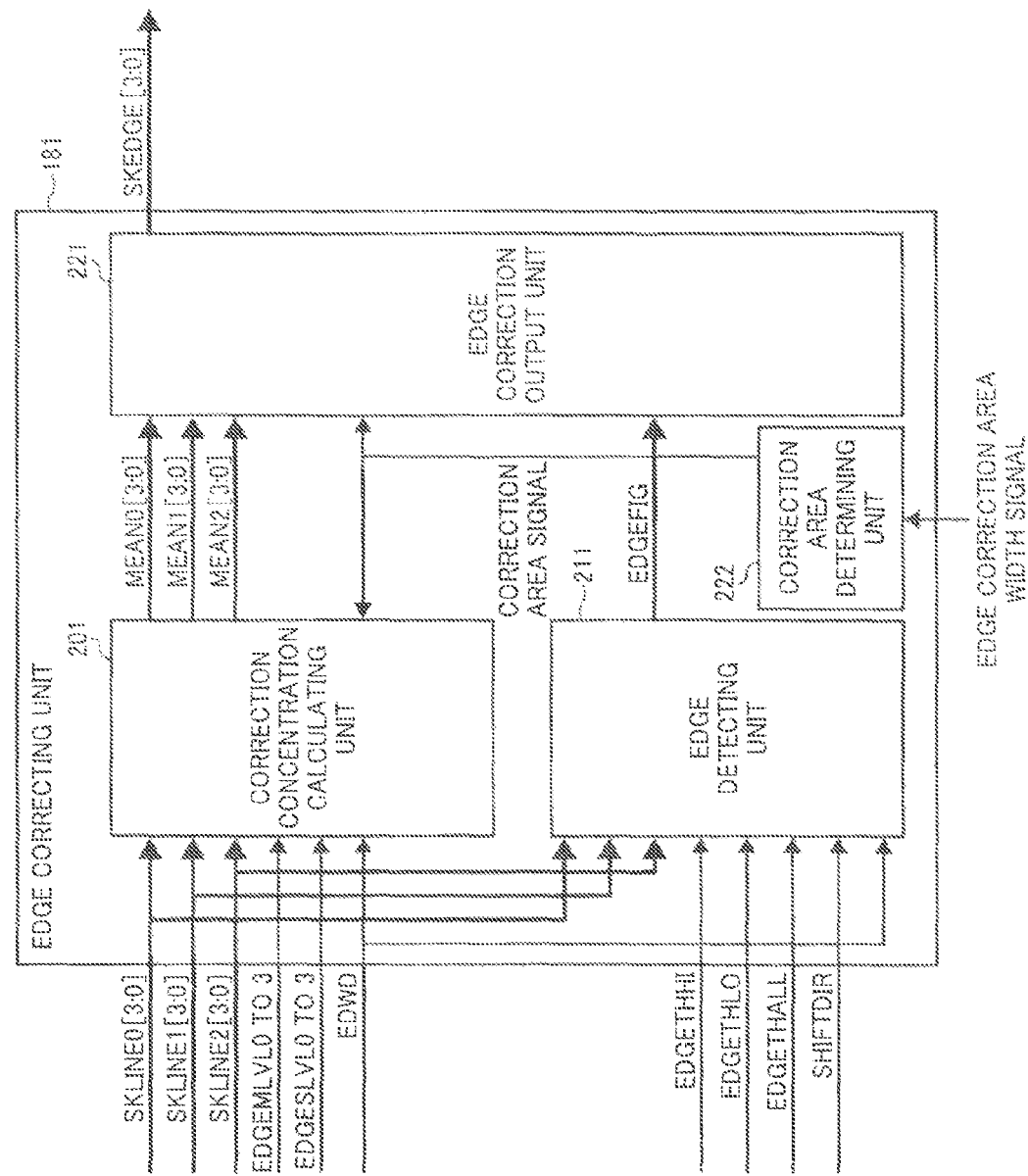
FIG. 9 is a block diagram that illustrates the functional structure of an edge correcting unit.

An explanation will be given of the details of the edge correcting unit 181. FIG. 9 is a block diagram that illustrates the functional structure of the edge correcting unit 181. As illustrated in FIG. 9, the edge correcting unit 181 includes a correction concentration calculating unit 201, an edge detecting unit 211, a correction area determining unit 222, and an edge correction output unit 221.

The correction concentration calculating unit 201 performs the concentration calculation by using a set of pixels including a pixel of interest and pixels above and below the interested pixel and then outputs the result of the concentration calculation to the edge detecting unit 211. Furthermore, the correction concentration calculating unit 201 performs the concentration calculation within the correction area described later and then outputs the result of the concentration calculation to the edge correction output unit 221.

The edge detecting unit 211 sequentially sets a pixel (the pixel that corresponds to the connection position at the lower section of FIG. 7) at the connection portion as a pixel of interest and, for each pixel of interest, performs the edge detection process to determine whether the pixel of interest is an edge pixel, which is a pixel that constitutes an edge portion, by using the result of the concentration calculation (the concentration calculation of the above mentioned set of pixels) output from the correction concentration calculating unit 201.

If it is determined that the pixel of interest is an edge pixel, the correction area determining unit 222 performs the correction area determination process to determine the edge correction area that is an area in which the correction is performed. In the present embodiment, the correction area is a certain area in the main scanning direction with respect to the edge pixel. An edge correction flag indicative of the determined correction area is output as a correction area signal to the correction concentration calculating unit 201 and the edge correction output unit 221.

The edge correction output unit 221 performs the concentration correction within the correction area determined by the correction area determining unit 222 by using the result of the concentration calculation output from the correction concentration calculating unit 201 and outputs the image that has undergone the concentration correction to the write image processing units 131Y, 131M, 131C, and 131K. Thus, it is possible to convert only pixels at the edge portion, for which the correction is needed, into a smooth image and output it.

In the following descriptions, the details of each unit will be explained. Image data, corresponding to three lines output from the data selector 161, is input to the edge detecting unit 211. The edge detecting unit 211 sequentially sets a pixel at the connection portion, which is the image shift portion because of the skew correction, as a pixel of interest and, for each pixel of interest, determines whether the pixel of interest is an edge pixel in accordance with the concentration value of image data that is the result of the concentration calculation (of the set of pixels) output from the correction concentration calculating unit 201.

The edge detecting unit 211 determines whether it is an edge pixel in the manner described below. In the following descriptions, an example is illustrated in which determination is performed by referring to an area defined by three lines in the sub-scanning direction and eight pixels in the main scanning direction. An input image in three lines is stored in a register for three lines×eight pixels. As illustrated in FIG. 10, the edge detecting unit 211 first divides the area of (three lines)×(eight pixels) into six areas A to F. The correction concentration calculating unit 201 calculates the concentration of each of the areas, which is concentration of the pixels included in each of the areas, and then outputs it to the edge detecting unit 211. The edge detecting unit 211 determines whether the pixel D0 in the area D is an edge pixel by using the concentration values of the respective areas.

The edge detecting unit 211 according to the present embodiment calculates the concentration value of each of the areas A to F by adding the concentration values of four pixels in each area. Each pixel has 4 bits and has the concentration value from 0 to 15. Although an example is illustrated in which the concentration values of four pixels in one area are added, the number of pixels in an area for which the concentration values are added is not limited to this. Further, although the process of adding the concentration values of four pixels is performed by simply adding the concentration values of four pixels according to the present embodiment, the present invention is not limited to this, and a configuration may be such that the addition is performed with each pixel weighted.

The edge detecting unit 211 then determines whether each area belongs to a high concentration area or to a low concentration area by using the calculated concentration value of each area, which is the concentration of the pixels included in each of the area. This determination includes determination by comparing the calculated concentration value with a preset threshold. If it is equal to or higher than the threshold, determined a high concentration and, if it is lower than the threshold, determined a low concentration. The threshold may be one threshold Th, or alternatively may be a first threshold ThH for a high concentration and a second threshold ThL for a low concentration. If the concentration value of each area is equal to or higher than the first threshold ThH, the edge detecting unit 211 determines a high concentration and, if the concentration value is equal to or lower than the second threshold ThL, determines a low concentration.

If it is determined whether a low concentration area or a high concentration area by using the single threshold Th, there is a possibility of the occurrence of erroneous determination of an edge pixel determined in accordance with the change in the low concentration area and the high concentration area and the shift direction. On the other hand, in a case determined whether a low concentration area or a high concentration area by providing the two thresholds ThL and ThH, if the concentration of an area has a value between the threshold ThL and the threshold ThH, it is determined that it does not correspond to a pattern for detection of an edge pixel, whereby there is an advantage in that determination of an edge pixel can be performed with higher accuracy.

A configuration may be such that the thresholds Th, ThL, and ThH for determining a low concentration area/high concentration area are fixed values or changed as appropriate. For example, a configuration may be such that the thresholds Th, ThL, and ThH are changed in accordance with an image processing method for gradation processing, or the like, or image resolution.

Moreover, because a different gradation processing method is used for a color image depending on color, a configuration may be such that the thresholds Th, ThL, and ThH are set to different values depending on color.

The edge detecting unit 211 then determines whether the pixel D0 of interest is an edge pixel by using the concentration values of the six areas and the shift direction at the connection position. The shift direction is determined by using information on lines of the line memory from which the pixel D0 of interest and a previous pixel to the pixel of interest are output. If the shift is performed, the pixels before and after the connection position are output from different line memories; therefore, the edge detecting unit 211 can determine the shift direction by using the information on the output line.

Furthermore, the edge detecting unit 211 determines whether the pixel D0 of interest is an edge pixel in accordance with the combinations of two states of sloping diagonally up from left to right and sloping diagonally down from left to right, which is determined from the shift direction, and two states of changing from a high concentration to a low concentration and from a low concentration to a high concentration in combinations of concentrations of the respective areas. FIG. 11 is an explanatory diagram that illustrates an example of conditions for determining an edge pixel if the single threshold Th is used. FIG. 12 is an explanatory diagram that illustrates an example of conditions for determining an edge pixel if the two thresholds ThL and ThH are used.

As illustrated in FIG. 11 and FIG. 12, specifically, there are four conditions under which the edge detecting unit 211 determines that the pixel of interest is an edge pixel. Because the edge correction is not necessary even at the connection position except under these conditions, the edge detecting unit 211 determines that the pixel of interest is a non-edge pixel. The conditions for determining an edge pixel illustrated in FIG. 11 and FIG. 12 are examples, to which the present invention is not limited.

The edge detecting unit 211 can determine whether the pixel at the connection position is an edge pixel by the above-described process. If it is determined as an edge pixel, the concentration correction is performed within the correction area.

Figure 13A:
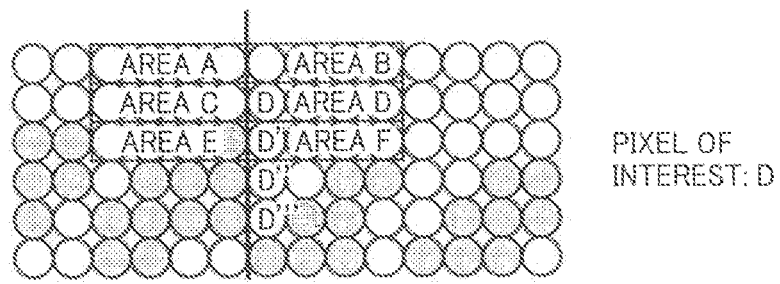
FIG. 13A is an explanatory diagram that illustrates an input image and areas for determination.
Figure 13B:
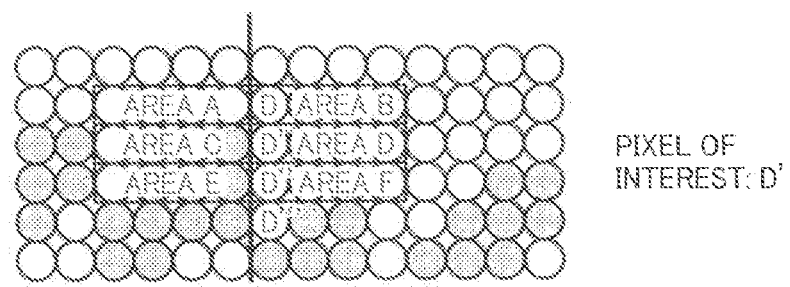
FIG. 13B is an explanatory diagram that illustrates an input image and areas for determination.
Figure 13C:
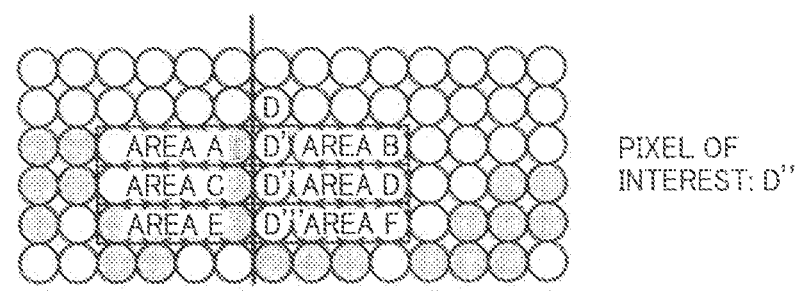
FIG. 13C is an explanatory diagram that illustrates an input image and areas for determination.
Figure 13D:
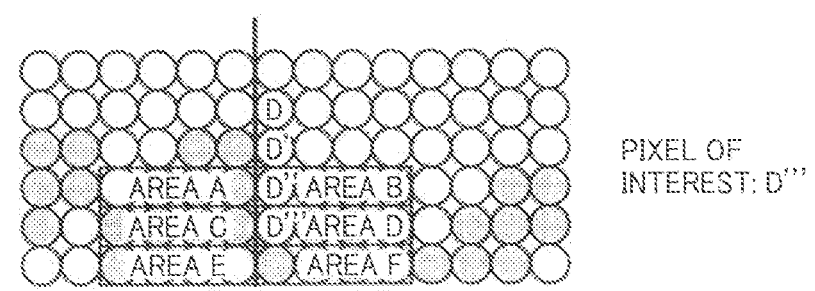
FIG. 13D is an explanatory diagram that illustrates an input image and areas for determination.

An explanation will be given below of an example of processing using an actual image with reference to FIG. 13A to FIG. 13D and FIG. 14. In the input image illustrated in FIG. 13A to FIG. 13D, a white pixel has the concentration value of 0 and a black pixel has the concentration value of 15. FIG. 14 illustrates determination results of pixels D, D', D", and D'" of interest if the first threshold ThH is 20 and the second threshold ThL is 15. As illustrated in FIG. 13B and FIG. 14, only when the pixel D0 of interest is D', the pixel D0 of interest is determined as an edge pixel and, in other cases, the pixel D0 (i.e., D, D", and D'") of interest is determined as a non-edge pixel. Thus, the edge detecting unit 211 can correctly determine whether it is an edge pixel with respect to an input image that is an image on which a halftone process such as a dither process has been performed.

Specifically, in the example illustrated in FIG. 14, with respect to area C and area D adjacent to each other in the main scanning direction, if the pixel D0 of interest is D', the area C is a high concentration area and the area D including the pixel D' of interest is a low concentration area; therefore, the high concentration area changes to the low concentration area from the area C to the area D. Moreover, with respect to the area D including the pixel of interest and the area F adjacent to the area D in the sub-scanning direction, the area D is a low concentration area and the area F is a high concentration area; therefore, the low concentration area changes to the high concentration area from the area D including the pixel D' of interest to the area F. Furthermore, the shift direction in this case is diagonally down from left to right. Thus, the edge detecting unit 211 detects that the pixel of interest is an edge pixel if a high concentration area changes to a low concentration area between an area including the pixel of interest and an area adjacent to the area in the main scanning direction, the low concentration area changes to a high concentration area between the area including the pixel of interest to an area adjacent to the area in the sub-scanning direction, and the shift direction is diagonally down from left to right.

Moreover, in an example other than the example illustrated in FIG. 14, the edge detecting unit 211 detects that the pixel of interest is an edge pixel if a low concentration area changes to a high concentration area between the area including the pixel of interest and an area adjacent to the area in the main scanning direction, the high concentration area changes to a low concentration area between the area including the pixel of interest to an area adjacent to the area in the sub-scanning direction, and the shift direction is diagonally up from left to right.

Although the edge detection is performed on an image after the image is shifted by the skew correction process according to the present embodiment, the present invention is not limited to this. A configuration may be such that the edge detecting unit 211 determines whether it is an edge pixel with respect to an image before the image is shifted by the skew correction process.

Figure 15:
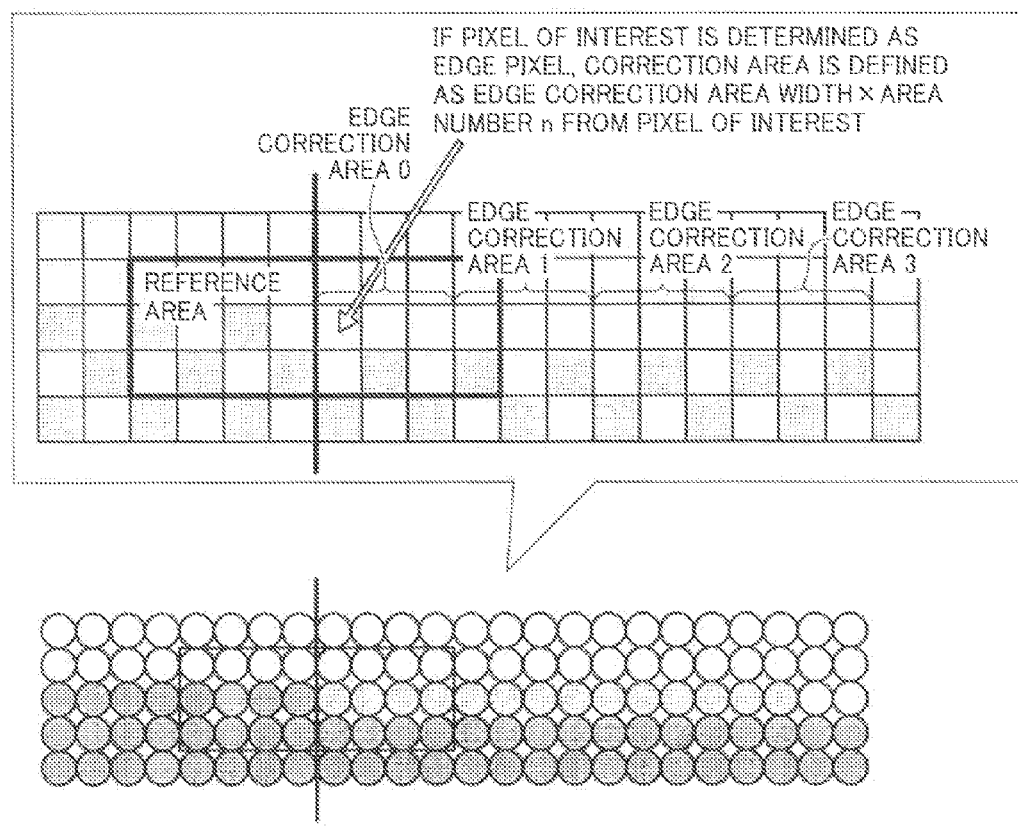
FIG. 15 is a diagram that illustrates a concentration correction of pixels.

If it is determined that the pixel D0 of interest is an edge pixel by the edge detection process performed by the edge detecting unit 211, the correction area determining unit 222 determines pixels within a predetermined correction area from the pixel D0 of interest in the main scanning direction as pixels that are to be subjected to the edge correction (concentration correction). In practice, the correction area determining unit 222 receives, from the skew output control unit 171, the edge correction area width signal indicative of the edge correction area width that includes the number of pixels as a unit for the edge correction (concentration correction). If it is determined that the pixel D0 of interest is an edge pixel, the correction area determining unit 222 determines the area number n of areas that corresponds to the edge correction area width, thereby determining the correction area. Specifically, as illustrated in FIG. 15, the correction area determining unit 222 determines the area of the (edge correction area width)×(the area number n) as the correction area.

The edge correction area width output from the skew output control unit 171 is a value defined in accordance with a condition that meets a process characteristic. Furthermore, the edge correction area width may be changed in accordance with a shift interval that is determined from a skew amount. A configuration may be such that the edge correction area width is changed in accordance with a concentration change amount in an edge portion. Moreover, because a different degradation processing method is used for a color image depending on color, a different value may be set for the edge correction area width for each color respectively.

The correction area determining unit 222 sets the edge correction flag to ON and clears the counter that counts the edge correction area. The edge correction flag is a flag that indicates whether a certain number of pixels from the edge pixel in the main scanning direction is determined to be the correction area and is stored in a storage medium such as a memory. If the edge correction flag is ON, it is indicated that the correction area has been determined and, if the edge correction flag is OFF, it is indicated that the correction area has not been determined. The edge correction output unit 221 outputs the edge correction flag as the correction area signal to the correction concentration calculating unit 201 and the edge correction output unit 221. The correction area determining unit 222 sets the area correction flag to ON and outputs it as the correction area signal to the edge correction output unit 221 for the number of times corresponding to the value of the area of (the edge correction area width)×(the area number n) so that the edge correction output unit 221 performs the concentration correction on the pixels within the determined correction area, i.e., the area of the edge correction area width×the area number n, from the edge pixel.

According to the present embodiment, the edge correction area width and the area number n are fixed values. Therefore, the correction area determining unit 222 determines the correction area as a fixed value and, as a result, the edge correction output unit 221 performs the concentration correction on the pixels within a certain correction area from the edge pixel.

In the subsequent process, if the edge correction flag is ON, the edge detecting unit 211 compares the counter value of the counter with the preset vale n of the correction area and, if the value of the counter is equal to or lower than n, it is determined that it falls within the edge correction area and, if the value of the counter is higher than n, the edge correction flag is set to OFF.

If it is determined that the pixel of interest is an edge pixel, as illustrated in FIG. 15, the correction concentration calculating unit 201 calculates the concentration of pixels within the correction area (the area of the edge correction area width×the area number n) from the edge pixel, and the edge correction output unit 221 performs the concentration correction and outputs it. The correction concentration calculating unit 201 refers to the pixels above and below the pixel of interest and performs a weighted average process such that the pixel of interest and the pixels above and below the pixel are multiplied by weighting coefficients and averaged, thereby calculating the correction concentration.

Figure 16A:
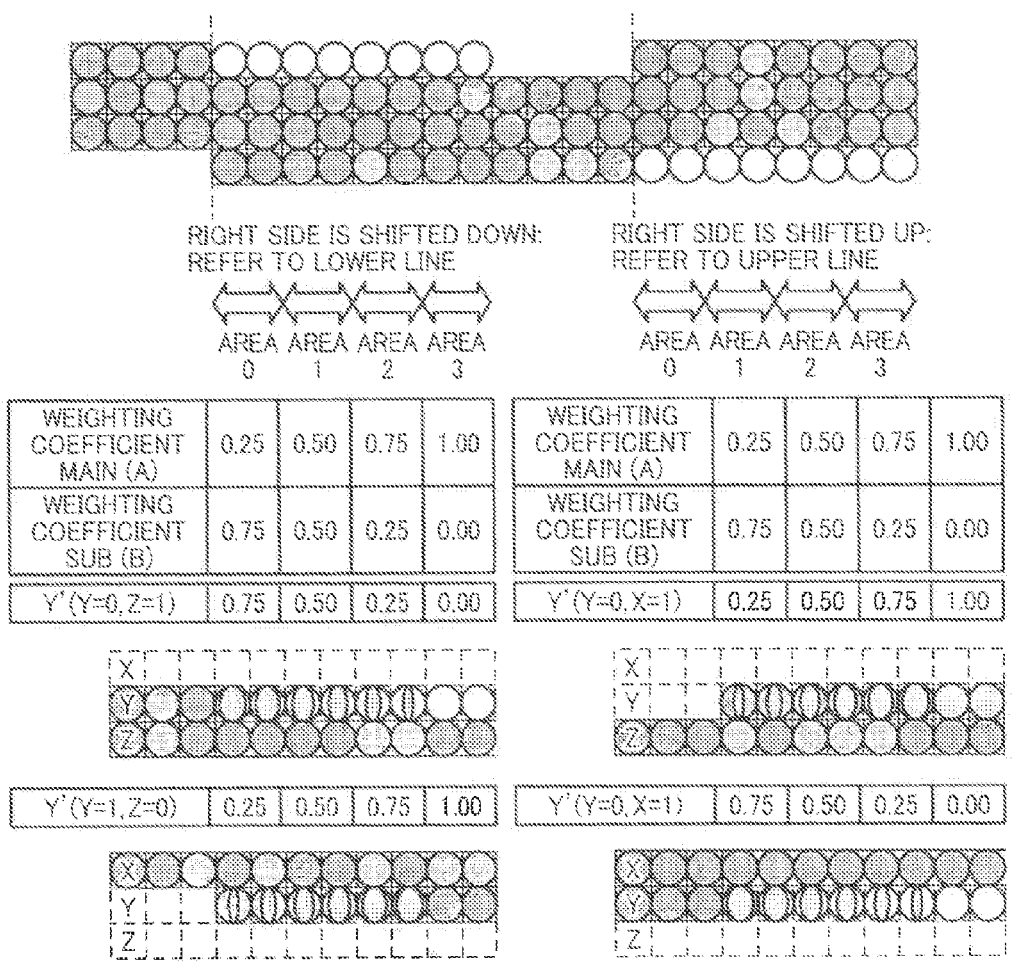
FIG. 16A is a schematic diagram that illustrates the relation between a weighting coefficient and an output pixel.

FIG. 16A is a schematic diagram that illustrates the relation between a weighting coefficient and an output pixel. As illustrated in FIG. 16A, the correction area is divided into four areas and a weighting coefficient is set for each of the areas, whereby an output can be performed at a halftone concentration. If four areas are referred to as areas 0 to 3, the correction concentration calculating unit 201 sets a corresponding weighting coefficient for a pixel of interest and a corresponding weighting coefficient for reference pixels.

Figure 16B:
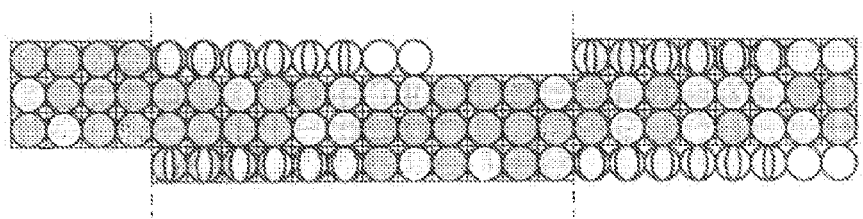
FIG. 16B is a schematic diagram that illustrates the relation between weighting coefficients and output pixels.

The calculation for the concentration correction performed by the correction concentration calculating unit 201 is performed by switching a pixel to be referred to in accordance with the shift direction of an area. Specifically, the correction concentration calculating unit 201 performs the weighted average process by using the above-described weighted coefficients with respect to the pixel of interest and the pixel below the pixel (Y line and Z line in FIG. 16A) if the shift direction of the area is diagonally down from left to right, or with respect to the pixel of interest and the pixel above the pixel (X line and Y line in FIG. 16A) if the shift direction of the area is diagonally up from left to right. The edge correction output unit 221 performs the concentration correction on the input image illustrated in FIG. 16A by using the correction concentration calculated by the correction concentration calculating unit 201 by the above process, thereby obtaining the image illustrated in FIG. 16B.

The configuration is such that a weighting coefficient for determining the concentration of each level, the width of each level, and the entire width of the correction area can be set to any value. Thus, the optimal settings can be performed depending on the condition.

Furthermore, the maximum of the correction area is the skew correction area (L in FIG. 5D).

Although the correction area determining unit 222 determines the correction area as a constant fixed area according to the present embodiment, the present invention is not limited to this, and the correction area can be variably determined. For example, a configuration may be such that the correction area determining unit 222 variably determines the correction area in accordance with the resolution of an input image in the sub-scanning direction. In this case, for example, if the resolution in the sub-scanning direction is low, the correction area determining unit 222 can determine a correction area of wide values so as to reduce jaggy, whereby an image can be smooth.

Furthermore, a configuration may be such that the correction area determining unit 222 variably determines the correction area in accordance with a position interval between the connection points. In this case, if the position interval between the connection points is narrow, the correction area determining unit 222 determines a correction area to be narrow values so that the correction area can be included between the connection points.

Further, the correction area determining unit 222 can determine the correction area as a value defined in accordance with a characteristic condition of an image forming process. Moreover, the correction area determining unit 222 can variably determine the correction area in accordance with a shift interval that is determined from a correction amount for the skew correction. The correction area determining unit 222 may determine a different value for the correction area depending on color.

Thus, if the correction area is variably determined, a configuration may be such that the correction area determining unit 222 receives, from the skew output control unit 171, or the like, the resolution in the sub-scanning direction, the position interval between the connection points, the condition of the image forming process, the shift interval, or the color, and then determines the correction area by increasing or decreasing the area number n in accordance with the various types of input information. Alternatively, a configuration may be such that the skew output control unit 171 increases or decreases the edge correction area width to be output to the correction area determining unit 222 in accordance with these various types of information.

The correction area determining unit 222 can variably determine the correction area in accordance with the concentration change amount in the edge portion. In this case, a configuration may be such that, when the edge detecting unit 211 detects the edge pixel, the edge detecting unit 211 outputs the concentration change amount of the edge pixel and the surrounding pixels to the correction area determining unit 222, and the correction area determining unit 222 determines the correction area by increasing or decreasing the above-described area number n in accordance with the concentration change amount of the edge pixel and the surrounding pixels output from the edge detecting unit 211.

A weighting coefficient set by the correction concentration calculating unit 201 is a value defined in accordance with a condition that meets a process characteristic such as dot reproduction. Although a weighting coefficient may be a fixed value independently of an image, a configuration may be such that the weighting coefficient is varied in accordance with the resolution in the sub-scanning direction.

Because a different gradation processing method is used for a color image depending on color, a weighting coefficient may be a common value among respective colors or may be set to a different value in accordance with a characteristic of each color.

Figure 17:
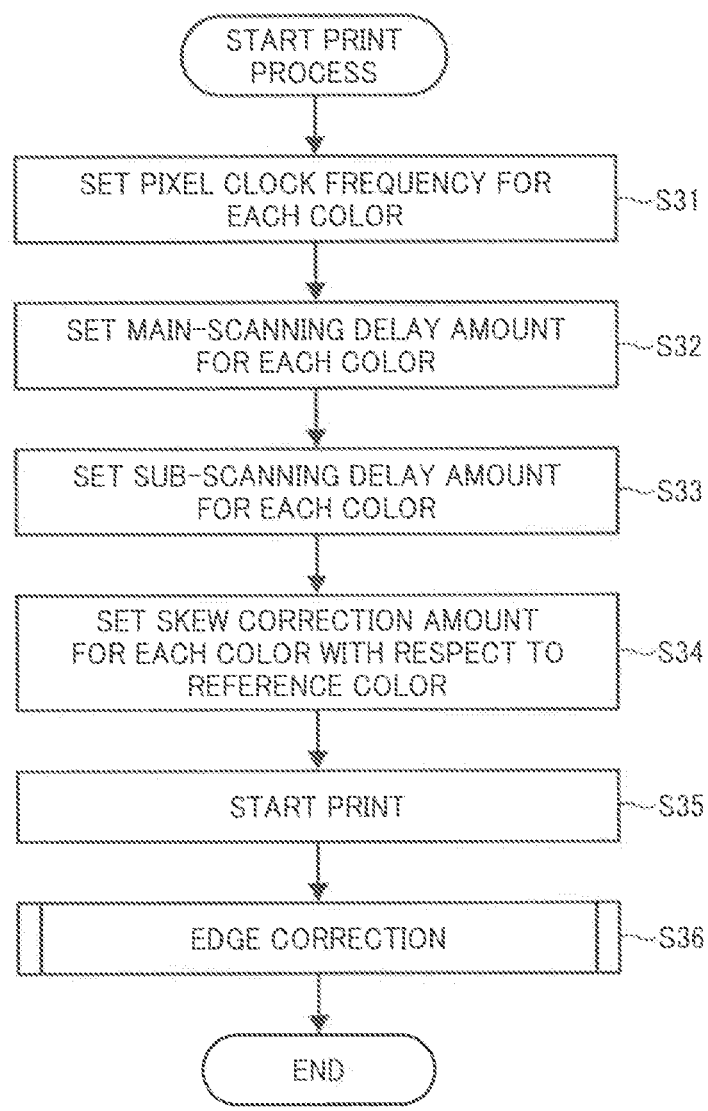
FIG. 17 is a flowchart that illustrates an example of the procedure of the overall print process.

Next, an explanation will be given of a print process according to the present embodiment configured as described above. FIG. 17 is a flowchart that illustrates an example of the procedure of the overall print process according to the present embodiment.

First, upon receiving a print request, the write control unit 125 sets the pixel clock frequency for each of the colors K, M, C, and Y in accordance with the above-described main-scanning magnification correction amount (Step S31). Then, the main-scanning delay amount is set for each color in accordance with the main registration correction amount stored in the RAM 123 (Step S32). Further, the sub-scanning delay amount is set for each color in accordance with the sub registration correction amount stored in the RAM 123 (Step S33).

Afterward, the skew correction amount for the colors M, C, and Y with respect to the reference color (K color) is set in accordance with the skew correction amount and tone number information of each color (Step S34). Then, while the print operation is started, the image correction is performed in accordance with the main-scanning pixel clock frequency set for each of the colors K, M, C, and Y, the main-scanning delay amount, the sub-scanning delay amount, and the skew correction amount (Step S35). The edge correction process is then performed by the edge correcting unit 181 (Step S36) and the print process is terminated.

Figure 18:
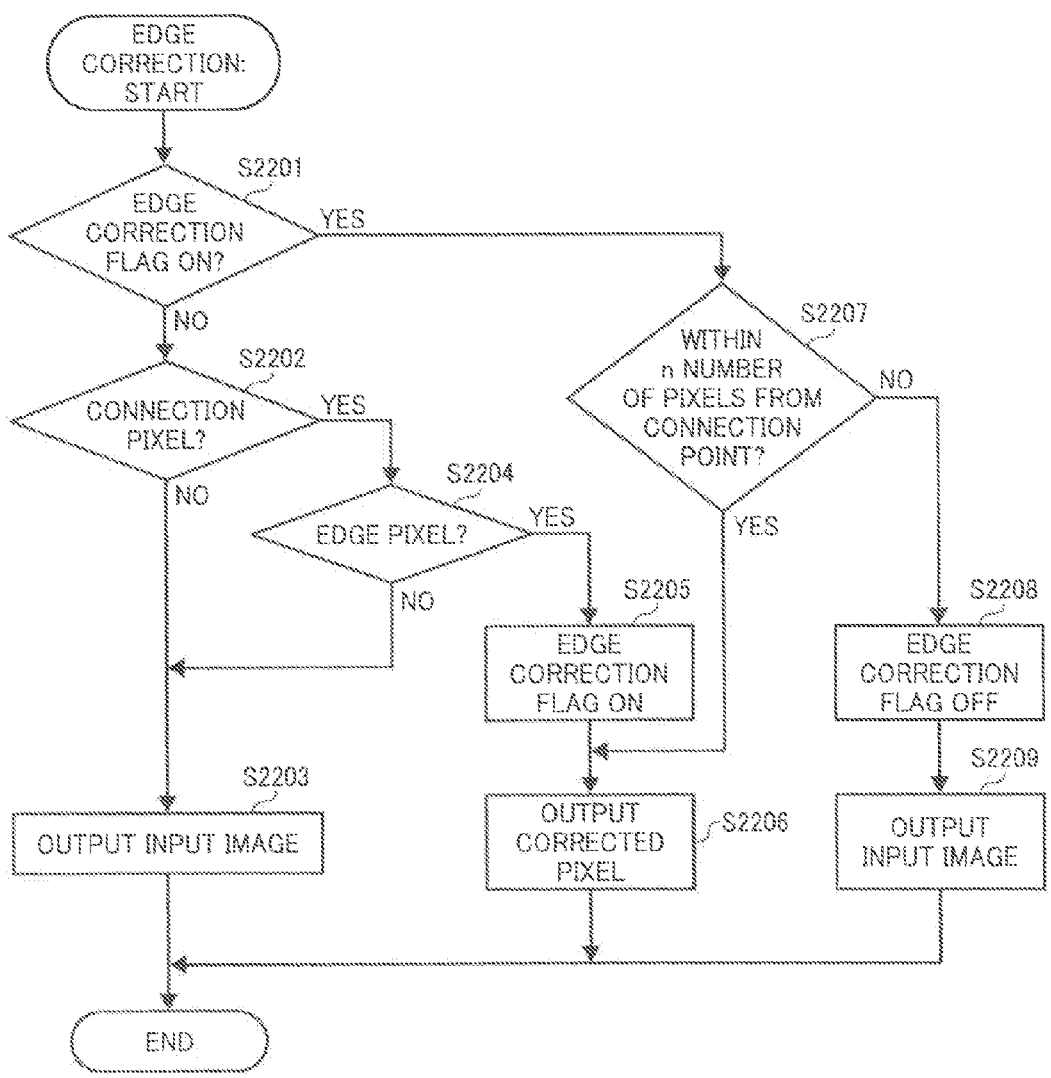
FIG. 18 is a flowchart that illustrates the procedure of an edge correction process according to a first embodiment.

Next, an explanation will be given of the edge correction process at Step S36. FIG. 18 is a flowchart that illustrates the procedure of the edge correction process according to the first embodiment. The following process is performed on each pixel.

First, the edge detecting unit 211 determines whether the edge correction flag is ON (Step S2201). The edge correction flag is set at Steps S2205 and S2208 in the edge detection process where the pixel of interest is the pixel processed immediately before the current pixel of interest.

If the edge correction flag is OFF (Step S2201: No), the edge detecting unit 211 detects whether the pixel of interest is a connection pixel (Step S2202). If the pixel of interest is not a connection pixel (Step S2202: No), the edge correction output unit 221 outputs the concentration value input to the edge correcting unit 181 without change (Step S2203).

Conversely, if the pixel of interest is a connection pixel (Step S2202: Yes), the edge detecting unit 211 determines whether the pixel of interest is an edge pixel by using the above-described method (Step S2204).

If the pixel of interest is a connection pixel but not an edge pixel (Step S2204: No), the edge correction output unit 221 outputs the concentration value input to the edge correcting unit 181 without change (Step S2203).

On the other hand, if the pixel of interest is an edge pixel (Step S2204: Yes), the edge detecting unit 211 sets the edge correction flag to ON (Step S2205), and the edge correction output unit 221 outputs the concentration value that has been corrected by the correction concentration calculating unit 201 (Step S2206).

Returning to Step S2201, if the edge correction flag is ON (Step S2201: Yes), the edge detecting unit 211 determines whether it falls within n number of pixels, which indicates the length of the preset correction area, from the connection point (Step S2207).

If it falls within n number of pixels from the connection point (Step S2207: Yes), the edge correction output unit 221 outputs the concentration value that has been corrected by the correction concentration calculating unit 201 (Step S2206). On the other hand, if it falls outside n number of pixels from the connection point (Step S2207: No), the edge detecting unit 211 sets the edge correction flag to OFF (Step S2208), and the edge correction output unit 221 outputs the concentration value input to the edge correcting unit 181 without change (Step S2209).

By using the above-described process, it is possible to perform correction on pixels that correspond to the length of the correction area from the edge pixel at the connection point.

Thus, according to the present embodiment, the edge pixel of a line image or an image is detected from a connection portion of the image that is caused by the skew correction, and the concentration correction (edge correction) is performed by the edge correction output unit 221 on only pixels within a predetermined correction area in the main scanning direction from the edge pixel. Therefore, unlike conventional technology in which a smoothing process is performed on only a monochrome image, even if skew correction is performed on a color image on which a halftone process has been performed for each color in order to obtain gradation, the pixels within the above-described correction area are subjected to the edge correction (concentration correction) so that a jagged portion of the line image can be smooth and an image with high quality can be obtained.

Moreover, according to the present embodiment, the correction area determining unit 222 determines the correction area and the edge correction output unit 221 performs edge correction on the pixels within the correction area; therefore, unlike a conventional smoothing process, during the edge correction (concentration correction), the correction area is not limited by a pattern size while it is possible to prevent the concentration correction from being performed without limitation on the image on which the halftone process has been performed, whereby the concentration correction can be sufficiently performed on the jagged portion caused by the skew correction without degrading gradation.

As a result, even if the skew correction is performed on an image such as a color image on which a halftone process has been performed, it is possible to make any jaggy to be smooth and unnoticeable at an edge portion of a line image or an image within a sufficient area and considerably improve the image quality without degrading gradation.

According to the first embodiment, it is determined whether a pixel is an edge pixel at the connection position of the image that has undergone skew correction and, if it is an edge pixel, it is determined that pixels within a predetermined area in the main scanning direction are within the correction area, and then concentration correction is performed on the pixels within the correction area. According to the first embodiment, regions in three lines are used and edge detection is performed by using the concentration value of each of the areas obtained by dividing the region; however, if it is a low concentration area, such as within an image that has undergone a dither process, the image has a low concentration overall and fewer pixels appear in the area, which results in a decrease in the detection accuracy of the edge detection. Specifically, for example, as illustrated in FIG. 19, if an input image has a low concentration overall, the pixels appear thinly in the area; therefore, a pixel, which should not be determined as an edge pixel, at the connection position may be determined as an edge pixel and the concentration correction may be performed within the correction area.

In consideration of the above, if a configuration is such that the concentration is obtained by referring to areas over a wider range than the three lines in the sub-scanning direction so as to detect an edge pixel, the possibility of erroneous detection of an edge pixel is reduced; however, a complicated and large-sized circuit is required.

Therefore, according to a second embodiment, in addition to the process of detecting the level of the concentration for each of the six areas, the edge detecting unit 211 compares the sum of the concentrations of the six areas with a predetermined reference value, thereby determining whether it is a low concentration area and, if it is a low concentration area, the concentration correction is not performed by the edge correction output unit 221.

Specifically, as illustrated in FIG. 20, the edge detecting unit 211 determines whether the sum of the concentrations of the areas A to F is equal to or more than the reference value in addition to a determination condition on the basis of each area and the shift direction. Specifically, the correction concentration calculating unit 201 calculates the sum of the concentrations of the areas A to F and outputs the calculation result to the edge detecting unit 211 as well as calculating the concentration of each of the areas A to F. The edge detecting unit 211 then determines whether the sum of the concentrations of the areas A to F is equal to or more than the reference value and, if the sum is less than the reference value, i.e., it is a low concentration, it is determined that the edge correction (concentration correction) is not performed. In this case, the edge correction output unit 221 does not perform the concentration correction. If the sum of the concentrations of the areas A to F is equal to or more than the reference value, i.e., it is a high concentration, the edge detecting unit 211 determines whether it is an edge pixel and the edge correction output unit 221 performs the edge correction in the same manner as in the first embodiment.

The mechanical configuration of the image forming apparatus according to the present embodiment and the functional configuration of units other than the edge detecting unit 211, the correction concentration calculating unit 201, and the edge correction output unit 221 are the same as those in the first embodiment.

Thus, according to the present embodiment, if an input image has a low concentration overall, it is determined that the sum of the concentrations of the areas is lower than the reference value, i.e., it is a low concentration, and it is not determined that it is an edge pixel; therefore, it is possible to prevent a pixel, which should not be determined as an edge pixel at the connection position, from being determined as an edge pixel and from being performed of the edge correction, so that an image with high quality can be obtained. Although the concentration correction process is unlikely to be performed on an edge of a linear image or an image according to the present embodiment, its effect is small on the low concentration area where pixels are dispersed.

According to the first embodiment, it is determined whether it is an edge pixel at the connection position of the image that has undergone the skew correction and, if it is an edge pixel, it is determined that pixels within a predetermined area in the main scanning direction are within the correction area, and the concentration correction is performed on the pixels within the correction area. Although the determination of the edge pixel at the connection position is performed by referring to the surrounding pixels near the pixel of interest so that determination with high accuracy is achieved according to the first embodiment, determination with higher accuracy is achieved according to a third embodiment by considering a change in the states of pixels within the area where the concentration correction is performed.

Figure 21:
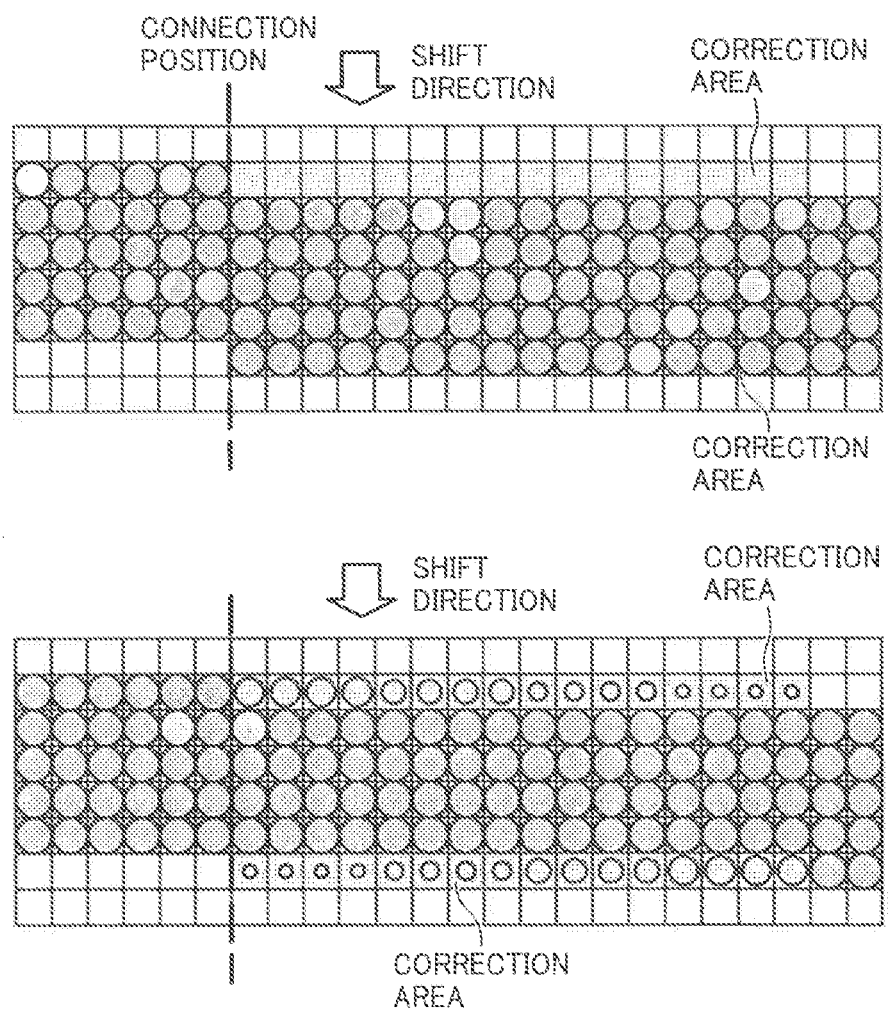
FIG. 21 is an explanatory diagram that illustrates a stare where a concentration correction is performed on an image according to a third embodiment.

Specifically, as illustrated in the upper section of FIG. 21, if the image within the correction area starting from the jagged position at the connection point is in the same state as the position that is determined as the edge pixel, the concentration correction is performed as illustrated in the lower section of FIG. 21; therefore, the jagged portion is converted into a smooth image.

However, there is a possibility that the image quality is degraded due to the correction depending on an image within the correction area starting from the jagged position at the connection point. For example, as illustrated in the upper section of FIG. 22, if the state of the image is changed within the correction area, there is a possibility that an image with an improper concentration is produced only at a portion where the state of the image is changed, due to the concentration correction process performed as illustrated in the lower section of FIG. 22.

According to the present embodiment, in the condition for determining the edge correction area by the edge detecting unit 211, as a condition for terminating the edge correction process, it is determined whether the state of the image is changed within the correction area, so that it is determined whether the concentration correction by the correction concentration calculating unit 201 and the edge correction output unit 221 is terminated or not. Such determination is performed as described below.

Specifically, in the same manner as in the first embodiment, the edge detecting unit 211 determines whether the value, obtained by adding the concentration values of four pixels in each area calculated by the correction concentration calculating unit 201, is larger than a preset threshold; and the edge detecting unit 211 stores the determination result in a memory, or the like, for each pixel. Specifically, if the value, obtained by adding the concentration values of four pixels in each area, is larger than the preset threshold, "1" (ON) is stored in a memory, or the like, as an edge determination result. On the other hand, if the value, obtained by adding the concentration values of four pixels in each area, is equal to or smaller than the preset threshold, "0" (OFF) is stored in a memory, or the like, as an edge determination result.

Figure 23:
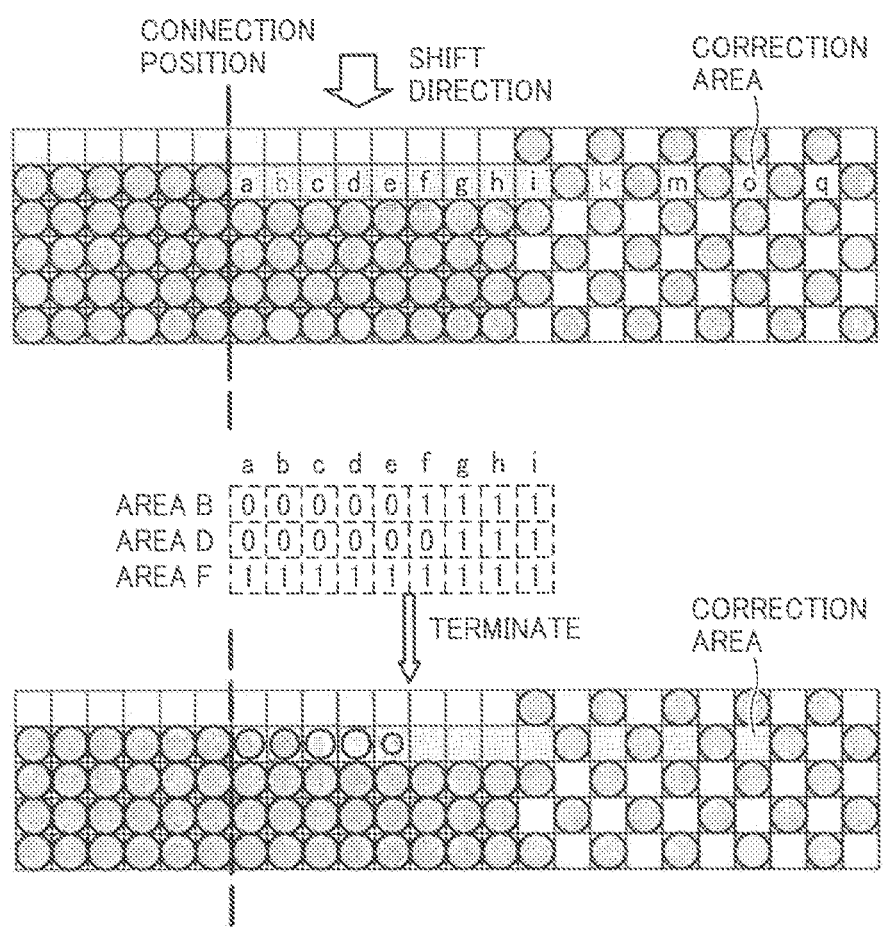
FIG. 23 is an explanatory diagram that illustrates an example of determination results of the area B, the area D, and the area F according to the third embodiment.

The edge correction output unit 221 according to the present embodiment refers to the edge determination result stored in the memory, or the like and, if the edge determination result does not change from the edge determination result of the surrounding pixels, performs the concentration correction; and if the edge determination result of the surrounding pixels changes, terminates the concentration correction so that the concentration correction is not performed on the changed pixel. For example, the determination results of the area B, the area D, and the area E at the position a of the connection portion illustrated in FIG. 23 are 0, 0 and 1, respectively. The edge detecting unit 211 sequentially performs a determination on subsequent pixels in the same manner.

If the edge detecting unit 211 sequentially performs detection up to the end position of the edge correction in the main scanning direction for the input image illustrated in FIG. 21, all determination results up to the end position are 0, 0, and 1.

On the other hand, if the process is performed in the same manner for the input image illustrated in FIG. 23, the determination results of the areas B, D, and E up to the pixel e are 0, 0, and 1, which are the same determination results as in the connection portion; however, when reaching the pixel f, the black pixel appears in the area B and the sum of the concentration values in the area B exceeds the threshold; therefore, the determination result of the area B is 1 so that the determination results of the areas B, D, and E are 1, 0, and 1, which are different values from the determination results at the connection portion.

Thus, if a different determination result from that at the connection portion is obtained, the correction concentration calculating unit 201 terminates the concentration correction process, and thereafter the edge correction output unit 221 outputs the input image without change.

Figure 22:
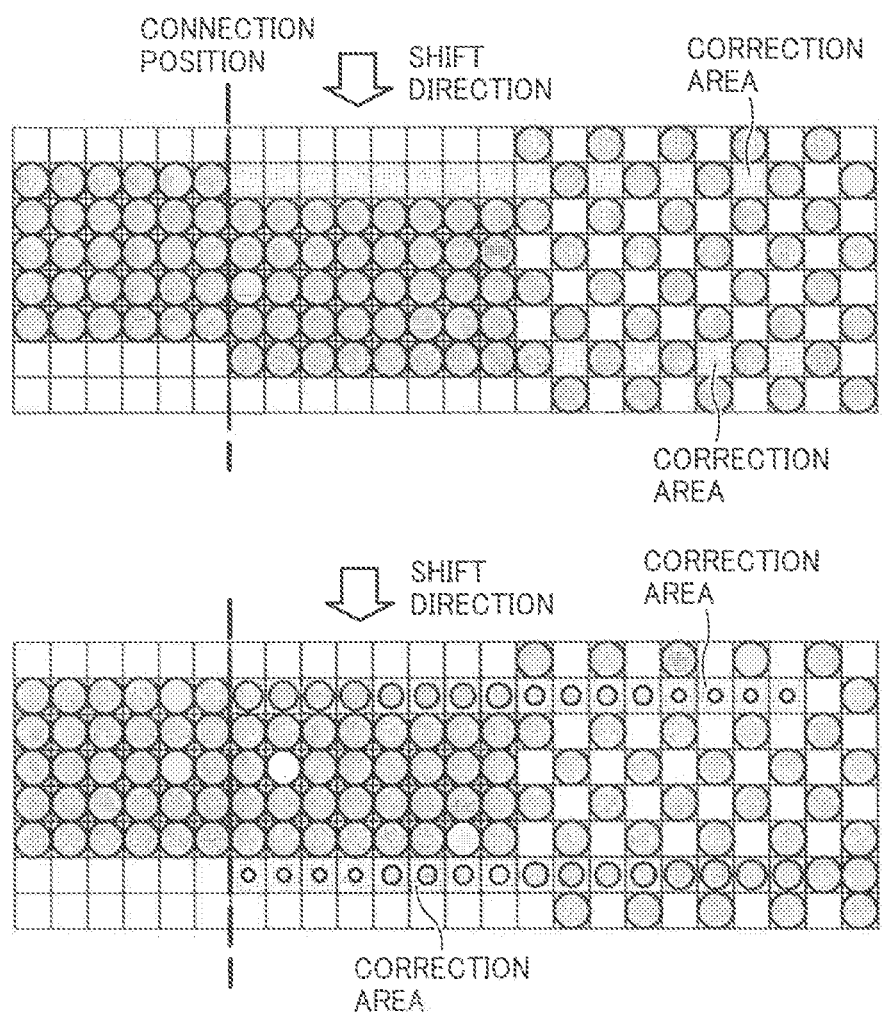
FIG. 22 is an explanatory diagram that illustrates a state where the concentration correction is performed if the state of the image is changed within a correction area according to the third embodiment.

If the termination process is not performed, the image illustrated in the lower section of FIG. 22 is produced and there is a possibility of degradation of gradation; however, the above-described determination process is performed by the edge detecting unit 211 so that, as illustrated in the lower section of FIG. 23, the concentration correction process of edge is not performed at a position where a problem is to occur if the concentration correction is performed, whereby it is possible to prevent degradation of the gradation.

The mechanical configuration of the image forming apparatus according to the present embodiment and the functional configuration of units other than the edge detecting unit 211, the correction concentration calculating unit 201, and the edge correction output unit 221 are the same as those in the first embodiment.

Figure 24:
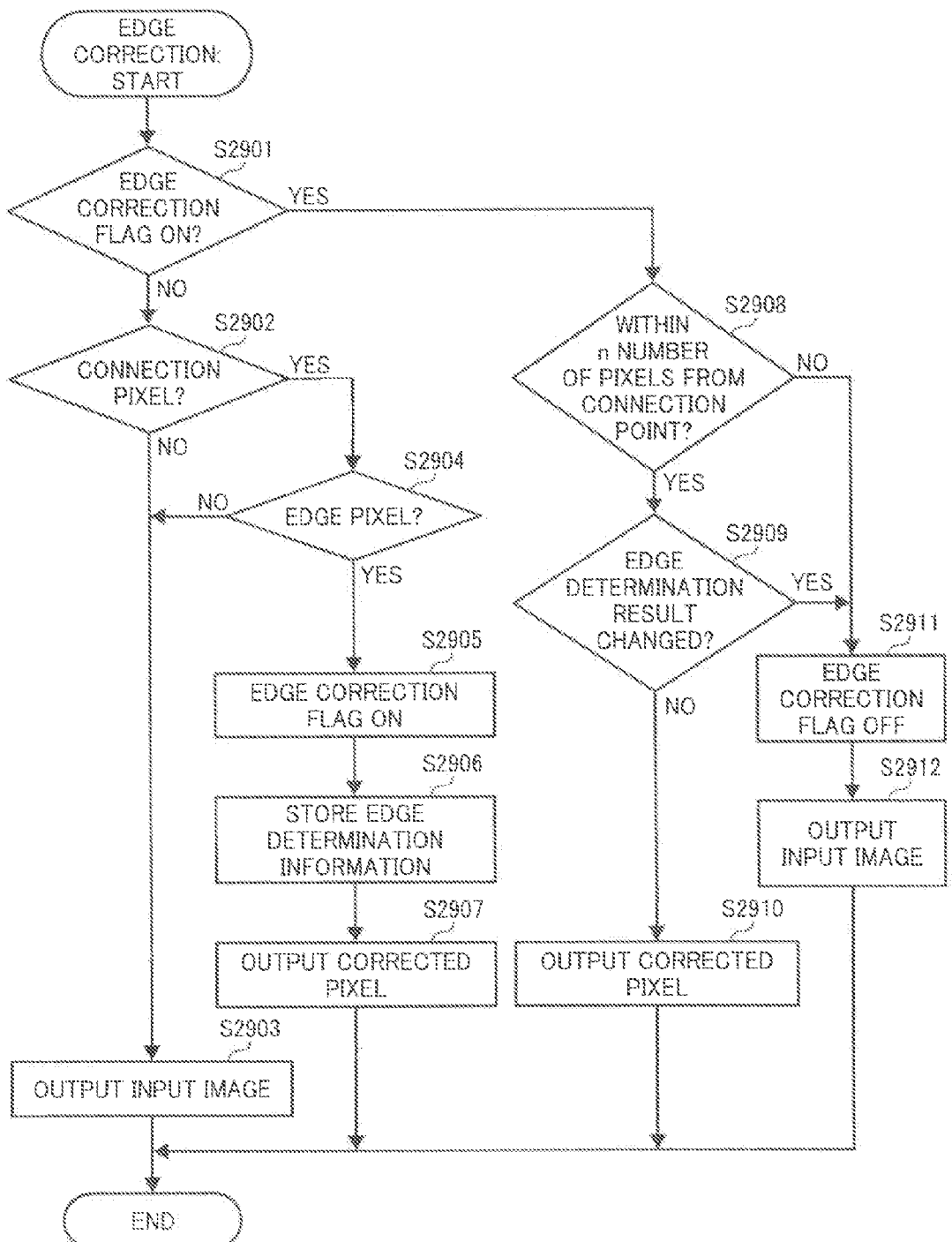
FIG. 24 is a flowchart that illustrates the procedure of the edge correction process according to the third embodiment.

Next, an explanation will be given of the edge correction process performed by the image forming apparatus according to the present embodiment configured as described above. The overall print process according to the present embodiment is performed in the same manner as the first embodiment. FIG. 24 is a flowchart that illustrates the procedure of the edge correction process according to the third embodiment. The following process is performed on each pixel.

The determination process (Step S2901) as to whether the edge correction flag is ON, the detection process (Step S2902) as to whether the pixel of interest is a connection pixel, the determination process (Step S2904) as to whether the pixel of interest is an edge pixel if the pixel of interest is the connection pixel, and the process (Step S2905) of setting the edge correction flag to ON if the pixel of interest is an edge pixel are performed in the same manner, respectively, as Steps S2201, S2202, S2204, and S2205 according to the first embodiment.

According to the present embodiment, after the edge correction flag is set to ON, the edge detecting unit 211 stores the edge determination result in the memory, or the like (Step S2906), and the edge correction output unit 221 outputs the concentration value that has been corrected by the correction concentration calculating unit 201 (Step S2907).

If the edge correction flag is ON at Step S2901 (Step S2901: Yes), in the same manner as the first embodiment, the edge detecting unit 211 determines whether it falls within n number of pixels, which indicates the length of the preset correction area, from the connection point (Step S2907) and, if it falls within n number of pixels from the connection point (Step S2907: Yes), it is determined whether the edge determination result changes from the edge determination result of the surrounding pixels stored in the memory (Step S2909).

If the edge determination result does not change (Step S2909: No), the correction concentration calculating unit 201 performs the concentration correction and the edge correction output unit 221 outputs the corrected concentration value (Step S2910).

On the other hand, if the edge determination result changes (Step S2909: Yes), the edge detecting unit 211 sets the edge correction flag to OFF (Step S2911) and, without the concentration correction being performed by the correction concentration calculating unit 201, the edge detecting unit 211 outputs the concentration value input to the edge correcting unit 181 without changing (Step S2912).

If it falls outside of n number of pixels from the connection point at Step S2908 (Step S2908: No), in the same manner as in the first embodiment, the edge detecting unit 211 sets the edge correction flag to OFF (Step S2911), and the edge correction output unit 221 outputs the concentration value input to the edge correcting unit 181 without change (Step S2912).

If the pixel of interest is not the pixel at the connection point at Step S2902 (Step S2902: No), in the same manner as the first embodiment, the edge correction output unit 221 outputs the concentration value input to the edge correcting unit 181 without change (Step S2903).

Thus, according to the present embodiment, the edge detection result as to whether the value obtained by adding the concentrations of four pixels in each area is larger than the threshold is stored by the edge detecting unit 211 so that the concentration correction is performed by the correction concentration calculating unit 201 only if the edge determination result of the pixel of interest does not change from the edge determination result of the surrounding pixels and the concentration correction of an edge is terminated if the edge determination result changes, i.e., at a position where a problem would occur if the concentration correction is performed, whereby it is thus possible to prevent degradation of the gradation of an image and to obtain an image with high quality.

Modified Example

The present invention is not limited to the above-described embodiments, and various modified examples can be applied.

For example, a configuration may be such that the main-scanning size of a reference area to be used for the edge detection process performed by the edge detecting unit 211 is determined on the basis of a preset dither matrix. In a case where the edge detection is performed on an image represented by a dither matrix, if the main-scanning size of the reference area is small, there is a possibility that the inside of the halftone concentration dither pattern is mistakenly determined as an edge portion. Especially, if a dither matrix with a moderate screen angle is preset, it is likely that the inside of the halftone concentration dither pattern is mistakenly determined as an edge portion; therefore, the main-scanning size of the reference area is set to be larger than a size where the erroneous determination is not caused by the dither matrix with a moderate screen angle.

Furthermore, if a pixel to be corrected is yellow, the color itself is not visually noticeable; therefore, the jaggy at the connection portion is not noticeable even without performing the concentration correction process. Therefore, a configuration may be such that the edge detection is not performed by the edge detecting unit 211 for a pixel with a color such as yellow that is not visually noticeable and the edge detection is performed for colors other than the corresponding color. Thus, if the pixel of interest has a color such as yellow that is not visually noticeable, the concentration correction is not performed by the correction concentration calculating unit 201.

Furthermore, the edge detecting unit 211 and the correction concentration calculating unit 201 may have a configuration to select whether the edge detection and the concentration correction process are to be performed in accordance with image resolution.

For example, if a sub-scanning resolution is high, jaggy at a connection position is reduced so that it is not visually noticeable. In this case, the smoothness of an image is not degraded even if correction is not performed on an edge portion. A configuration can be such that, if it is determined that a resolution in the sub-scanning direction is higher than a predetermined resolution, the edge detection is not performed by the edge detecting unit 211 and, if it is determined that the resolution in the sub-scanning direction is equal to or lower than the predetermined resolution, the edge detection is performed. Thus, if the resolution in the sub-scanning direction is higher than the predetermined resolution, the concentration correction is not performed by the correction concentration calculating unit 201.

An image forming program executed by the image forming apparatus according to the above-described embodiment is installed on a ROM, or the like, in advance to be provided.

A configuration may be such that the image forming program, executed by the image forming apparatus according to the above-described embodiment, is provided such that the image forming program is stored, in the form of a file that is installable or executable, in a recording medium readable by a computer, such as a CD-ROM, a flexible disk (FD), a CD-R, or a Digital Versatile Disk (DVD).

Furthermore, a configuration may be such that the image forming program, executed by the image forming apparatus according to the above-described embodiment, is provided such that the image forming program is stored in a computer connected via a network such as the Internet and downloaded via the network. Moreover, a configuration may be such that the image forming program, executed by the image forming apparatus according to the above-described embodiment, is provided or distributed via a network such as the Internet.

The image forming program, executed by the image forming apparatus according to the above-described embodiment, is made up of modules including the above-described units (the edge detecting unit, the correction concentration calculating unit, the edge correction output unit, the correction area determining unit, the image processing unit, and the like) and, as actual hardware, a CPU (processor) reads the image forming program from the above-described ROM and executes the read image forming program, so that each of the above-described units is loaded on a main storage device, whereby the edge detecting unit, the correction concentration calculating unit, the edge correction output unit, the correction area determining unit, the image processing unit, and the like are created on the main storage device.

According to the present invention, even if skew correction is performed on an input image that has undergone a halftone process, an advantage can be produced such that the smoothness at a jagged portion of a line image is maintained while an image with a high quality is obtained.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a skew correcting unit that performs skew correction by dividing an input image that has undergone a halftone process into image data in a predetermined skew correction area in a main scanning direction and by shifting the image data in the skew correction area in a sub-scanning direction;
   an edge detecting unit that detects whether a pixel at a division position between the image data after shifting is an edge pixel that constitutes an edge in accordance with concentrations of a set of pixels including the pixel at the division position within a predetermined area and a shift direction of the skew correction;
   a correction area determining unit that, if it is detected that the pixel at the division position is the edge pixel, determines a correction area that is an area of pixels including the edge pixel to be subjected to concentration correction within the skew correction area; and an edge correcting unit that corrects concentrations of the pixels within the correction area.

2. The image forming apparatus according to claim 1, further comprising a correction concentration calculating unit that calculates a concentration of the correction area by adding concentrations of each pixel of the set of the pixels within the correction area, wherein the edge detecting unit divides the image data into a plurality of areas and, in accordance with concentrations of the plurality of areas calculated by the correction concentration calculating unit and the shift direction, detects whether the pixel at the division position is the edge pixel.

3. The image forming apparatus according to claim 2, wherein the edge detecting unit determines the predetermined area as a high concentration area if the concentration of the area is higher than a predetermined threshold, determines the predetermined area as a low concentration area if the concentration of the area is equal to or lower than the predetermined threshold, and detects that the pixel at the division position is the edge pixel in accordance with a change between the high concentration area and the low concentration area in adjacent areas in the main scanning direction and a sub-scanning direction and the shift direction.

4. The image forming apparatus according to claim 3, wherein the edge detecting unit sets any pixel out of pixels at the division position as a pixel of interest, and detects that the pixel of interest is the edge pixel if the high concentration area changes to the low concentration area between the predetermined area including the pixel of interest and an area adjacent to the area in the main scanning direction, if the low concentration area changes to the high concentration area between the predetermined area including the pixel of interest and an area adjacent to the area in the sub-scanning direction, and if the shift direction is diagonally down from left to right.

5. The image forming apparatus according to claim 3, wherein the edge detecting unit sets any pixel out of pixels at the division position as a pixel of interest, and detects that the pixel of interest is the edge pixel if the low concentration area changes to the high concentration area between the predetermined area including the pixel of interest and an area adjacent to the area in the main scanning direction, if the high concentration area changes to the low concentration area between the predetermined area including the pixel of interest and an area adjacent to the area in the sub-scanning direction, and if the shift direction is diagonally up from left to right.

6. The image forming apparatus according to claim 2, wherein the correction concentration calculating unit further calculates a sum of concentrations of the plurality of areas, and the edge detecting unit detects whether the pixel at the division position is the edge pixel in accordance with respective concentrations of the plurality of areas, the sum of the concentrations, and the shift direction.

7. The image forming apparatus according to claim 2, wherein the edge detecting unit further detects presence or absence of a change in a state of the image data within the correction area, and if it is detected that the state of the image data is changed within the correction area, the edge correcting unit does not perform concentration correction on pixels of the image data for which the change is detected.

8. The image forming apparatus according to claim 7, wherein the edge correcting unit compares, for the plurality of areas, a magnitude of an addition value obtained by adding concentrations of pixels within the area with a predetermined second threshold and, if the magnitude of the addition value in each of the areas relative to the second threshold is changed, detects that the state of the image data is changed.

9. The image forming apparatus according to claim 1, wherein the correction area determining unit determines pixels including the edge pixel within a certain area as the correction area.

10. The image forming apparatus according to claim 1, wherein the correction area determining unit variably determines the correction area.

11. The image forming apparatus according to claim 10, wherein the correction area determining unit determines the correction area in accordance with a resolution of the input image in a sub-scanning direction.

12. The image forming apparatus according to claim 10, wherein the correction area determining unit determines the correction area in accordance with a position interval of the division position.

13. The image forming apparatus according to claim 10, wherein the correction area determining unit determines the correction area in accordance with a characteristic condition of an image forming process.

14. The image forming apparatus according to claim 10, wherein the correction area determining unit determines the correction area in accordance with a correction amount of the skew correction.

15. The image forming apparatus according to claim 10, wherein the correction area determining unit determines the correction area in accordance with a color of the pixel.

16. The image forming apparatus according to claim 10, wherein the correction area determining unit determines the correction area in accordance with a concentration change amount around the edge pixel.

17. An image forming method performed by an image forming apparatus comprising:

performing skew correction by dividing an input image that has undergone a halftone process into image data in a predetermined skew correction area in a main scanning direction and by shifting image data within the skew correction area in a sub-scanning direction;

detecting whether a pixel at a division position between the image data after the skew correction is an edge pixel that constitutes an edge in accordance with concentrations of a set of pixels including the pixel at the division position within a predetermined area and a shift direction of the skew correction;

determining, if it is detected that the pixel at the division position is the edge pixel, a correction area that is an area of pixels including the edge pixel to be subjected to concentration correction within the skew correction area; and correcting concentrations of the pixels within the correction area.

18. A non-transitory computer program product comprising a computer-usable medium having computer-readable program codes embodied in the medium for image forming in an image forming apparatus, the program codes when executed causing a computer to execute:

performing skew correction by dividing an input image that has undergone a halftone process into image data in a predetermined skew correction area in a main scanning direction and by shifting image data within the skew correction area in a sub-scanning direction;

detecting whether a pixel at a division position between the image data after the skew correction is an edge pixel that constitutes an edge in accordance with concentrations of a set of pixels including the pixel at the division position within a predetermined area and a shift direction of the skew correction;

determining, if it is detected that the pixel at the division position is the edge pixel, a correction area that is an area of pixels including the edge pixel to be subjected to concentration correction within the skew correction area; and correcting concentrations of the pixels within the correction area.

* * * * *